(12) United States Patent
Abedini et al.

(10) Patent No.: US 11,910,386 B2
(45) Date of Patent: Feb. 20, 2024

(54) SIGNALING PARAMETERS FOR RELAY DEVICES

(71) Applicant: QUALCOMM Incorporated, San Diego, CA (US)

(72) Inventors: Navid Abedini, Basking Ridge, NJ (US); Lenaig Genevieve Chaponniere, La Jolla, CA (US); Junyi Li, Fairless Hills, PA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/447,515

(22) Filed: Sep. 13, 2021

(65) Prior Publication Data

US 2022/0086817 A1    Mar. 17, 2022

Related U.S. Application Data

(60) Provisional application No. 63/078,188, filed on Sep. 14, 2020.

(51) Int. Cl.
| | |
|---|---|
| *H04W 72/20* | (2023.01) |
| *H04W 52/46* | (2009.01) |
| *H04W 72/044* | (2023.01) |
| *H04W 52/14* | (2009.01) |

(52) U.S. Cl.
CPC ........... *H04W 72/20* (2023.01); *H04W 52/14* (2013.01); *H04W 52/46* (2013.01); *H04W 72/0473* (2013.01)

(58) Field of Classification Search
None
See application file for complete search history.

(56) References Cited

U.S. PATENT DOCUMENTS

| | | | | |
|---|---|---|---|---|
| 2008/0021982 A1* | 1/2008 | Hannuki | ............... | H04M 15/68 |
| | | | | 709/219 |
| 2019/0053092 A1* | 2/2019 | Chun | .................... | H04W 16/14 |
| 2020/0389263 A1* | 12/2020 | Toeda | .................... | H04W 76/19 |

FOREIGN PATENT DOCUMENTS

| | | | | |
|---|---|---|---|---|
| EP | 3331265 A1 * | 6/2018 | ............ | H04W 24/08 |

* cited by examiner

*Primary Examiner* — Alex Skripnikov
(74) *Attorney, Agent, or Firm* — Harrity & Harrity LLP/Qualcomm Incorporated

(57) ABSTRACT

Various aspects of the present disclosure generally relate to wireless communication. In some aspects, a network node may determine at least one parameter associated with use of a relay device to forward data between the network node and one or more wireless devices, the at least one parameter including a use time associated with the relay device, an amount of data associated with the relay device, or a combination thereof. The network node may transmit, to a central network node, the at least one parameter. Accordingly, the network node and/or the central network node may determine a payment amount associated with the relay device based at least in part on the at least one parameter. Numerous other aspects are provided.

26 Claims, 15 Drawing Sheets

US 11,910,386 B2

SIGNALING PARAMETERS FOR RELAY DEVICES

CROSS-REFERENCE TO RELATED APPLICATION

This patent application claims priority to U.S. Provisional Patent Application No. 63/078,188, filed on Sep. 14, 2020, entitled "SIGNALING PARAMETERS FOR RELAY DEVICES," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for signaling parameters for relay devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a network node. The apparatus may include a memory and one or more processors couples to the memory. The one or more processors may be configured to determine at least one parameter associated with use of a relay device to forward data between the network node and one or more wireless devices, the at least one parameter including a use time associated with the relay device, an amount of data associated with the relay device, or a combination thereof. The one or more processors may be further configured to transmit, to a central network node, the at least one parameter.

Some aspects described herein relate to an apparatus for wireless communication at a first network node. The apparatus may include a memory and one or more processors couples to the memory. The one or more processors may be configured to receive, from a second network node, at least one parameter associated with use of a relay device to forward data between the second network node and one or more wireless devices, the at least one parameter including a use time associated with the relay device, an amount of data associated with the relay device, or a combination thereof. The one or more processors may be further configured to transmit, to a central network node, the at least one parameter.

Some aspects described herein relate to an apparatus for wireless communication at a first network node. The apparatus may include a memory and one or more processors couples to the memory. The one or more processors may be configured to receive, from a second network node, at least one parameter associated with use of a relay device to forward data with one or more wireless devices, the at least one parameter including a use time associated with the relay device, an amount of data associated with the relay device, or a combination thereof. The one or more processors may be further configured to determine, based at least in part on the at least one parameter, a payment amount associated with the relay device.

Some aspects described herein relate to an apparatus for wireless communication at a relay device. The apparatus may include a memory and one or more processors couples to the memory. The one or more processors may be configured to receive, from a network, data intended for one or more wireless devices. The one or more processors may be further configured to forward the data to the one or more wireless devices. The one or more processors may be configured to receive, from the network, an indication of a payment amount associated with the relay device, wherein the payment amount is based at least in part on a use time associated with the relay device, an amount of data associated with the relay device, or a combination thereof.

Some aspects described herein relate to a method of wireless communication performed by a network node. The method may include determining at least one parameter associated with use of a relay device to forward data between the network node and one or more wireless devices, the at least one parameter including a use time associated with the relay device, an amount of data associated with the relay device, or a combination thereof. The method may further include transmitting, to a central network node, the at least one parameter.

Some aspects described herein relate to a method of wireless communication performed by a first network node. The method may include receiving, from a second network node, at least one parameter associated with use of a relay device to forward data between the second network node and one or more wireless devices, the at least one parameter including a use time associated with the relay device, an amount of data associated with the relay device, or a combination thereof. The method may further include transmitting, to a central network node, the at least one parameter.

Some aspects described herein relate to a method of wireless communication performed by a first network node. The method may include receiving, from a second network node, at least one parameter associated with use of a relay device to forward data with one or more wireless devices, the at least one parameter including a use time associated with the relay device, an amount of data associated with the relay device, or a combination thereof. The method may further include determining, based at least in part on the at least one parameter, a payment amount associated with the relay device.

Some aspects described herein relate to a method of wireless communication performed by a relay device. The method may include receiving, from a network, data intended for one or more wireless devices. The method may further include forwarding the data to the one or more wireless devices. The method may include receiving, from the network, an indication of a payment amount associated with the relay device, wherein the payment amount is based at least in part on a use time associated with the relay device, an amount of data associated with the relay device, or a combination thereof.

Some aspects described herein relate to a non-transitory computer-readable medium that stores a set of instructions for wireless communication by a network node. The set of instructions, when executed by one or more processors of the network node, may cause the network node to determine at least one parameter associated with use of a relay device to forward data between the network node and one or more wireless devices, the at least one parameter including a use time associated with the relay device, an amount of data associated with the relay device, or a combination thereof. The set of instructions, when executed by one or more processors of the network node, may further cause the network node to transmit, to a central network node, the at least one parameter.

Some aspects described herein relate to a non-transitory computer-readable medium that stores a set of instructions for wireless communication by a first network node. The set of instructions, when executed by one or more processors of the first network node, may cause the first network node to receive, from a second network node, at least one parameter associated with use of a relay device to forward data between the second network node and one or more wireless devices, the at least one parameter including a use time associated with the relay device, an amount of data associated with the relay device, or a combination thereof. The set of instructions, when executed by one or more processors of the first network node, may further cause the first network node to transmit, to a central network node, the at least one parameter.

Some aspects described herein relate to a non-transitory computer-readable medium that stores a set of instructions for wireless communication by a first network node. The set of instructions, when executed by one or more processors of the first network node, may cause the first network node to receive, from a second network node, at least one parameter associated with use of a relay device to forward data with one or more wireless devices, the at least one parameter including a use time associated with the relay device, an amount of data associated with the relay device, or a combination thereof. The set of instructions, when executed by one or more processors of the first network node, may further cause the first network node to determine, based at least in part on the at least one parameter, a payment amount associated with the relay device.

Some aspects described herein relate to a non-transitory computer-readable medium that stores a set of instructions for wireless communication by a relay device. The set of instructions, when executed by one or more processors of the relay device, may cause the relay device to receive, from a network, data intended for one or more wireless devices. The set of instructions, when executed by one or more processors of the relay device, may further cause the relay device to forward the data to the one or more wireless devices. The set of instructions, when executed by one or more processors of the relay device, may cause the relay device to receive, from the network, an indication of a payment amount associated with the relay device, wherein the payment amount is based at least in part on a use time associated with the relay device, an amount of data associated with the relay device, or a combination thereof.

Some aspects described herein relate to an apparatus for wireless communication. The apparatus may include means for determining at least one parameter associated with use of a relay device to forward data between the apparatus and one or more wireless devices, the at least one parameter including a use time associated with the relay device, an amount of data associated with the relay device, or a combination thereof. The apparatus may further include means for transmitting, to a central network node, the at least one parameter.

Some aspects described herein relate to an apparatus for wireless communication. The apparatus may include means for receiving, from a network node, at least one parameter associated with use of a relay device to forward data between the network node and one or more wireless devices, the at least one parameter including a use time associated with the relay device, an amount of data associated with the relay device, or a combination thereof. The apparatus may further include means for transmitting, to a central network node, the at least one parameter.

Some aspects described herein relate to an apparatus for wireless communication. The apparatus may include means for receiving, from a network node, at least one parameter associated with use of a relay device to forward data with one or more wireless devices, the at least one parameter including a use time associated with the relay device, an amount of data associated with the relay device, or a combination thereof. The apparatus may further include means for determining, based at least in part on the at least one parameter, a payment amount associated with the relay device.

Some aspects described herein relate to an apparatus for wireless communication. The apparatus may include means for receiving, from a network, data intended for one or more wireless devices. The apparatus may further include means for forwarding the data to the one or more wireless devices. The apparatus may include means for receiving, from the network, an indication of a payment amount associated with the apparatus, wherein the payment amount is based at least in part on a use time associated with the apparatus, an amount of data associated with the apparatus, or a combination thereof.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
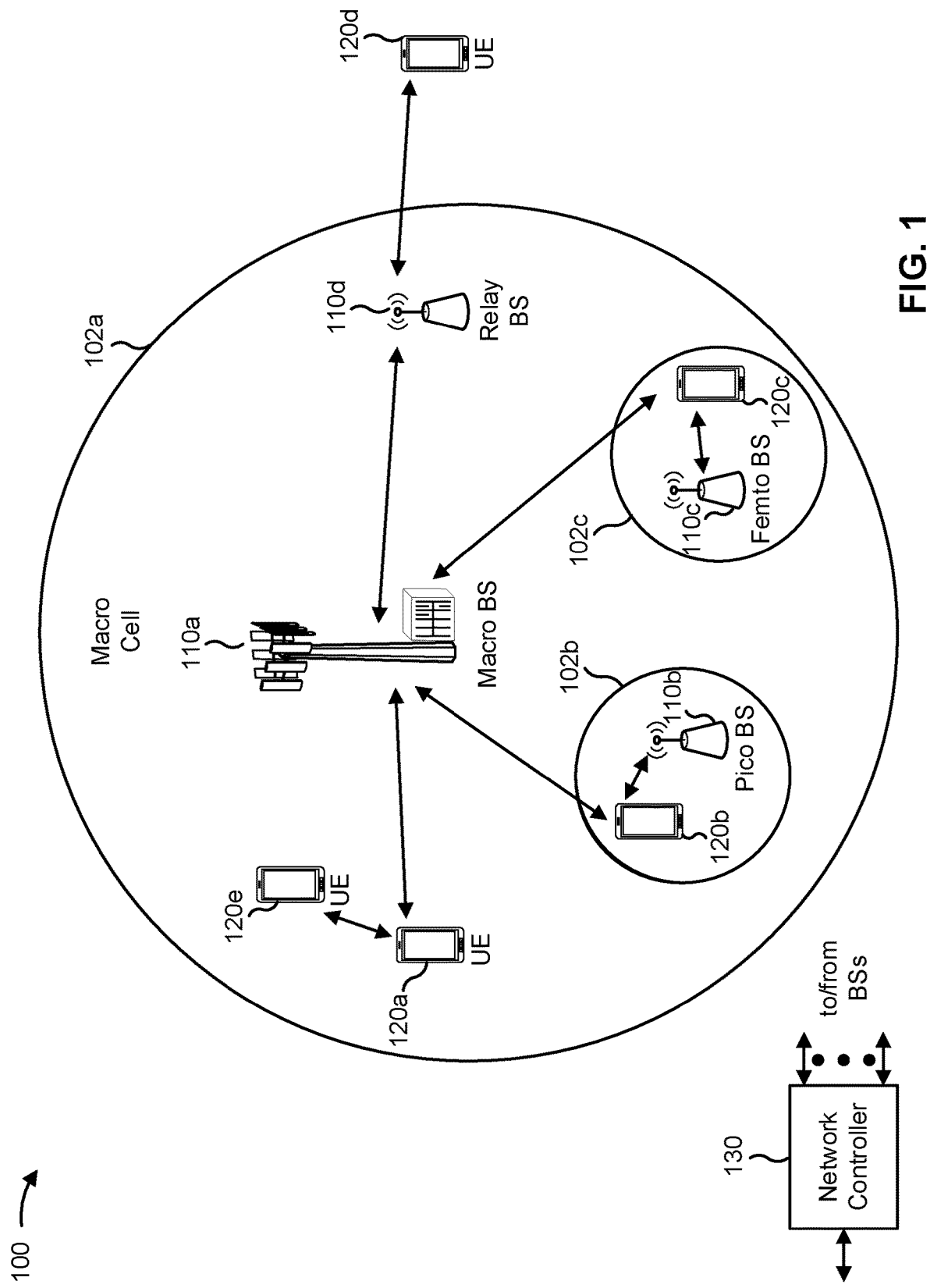
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
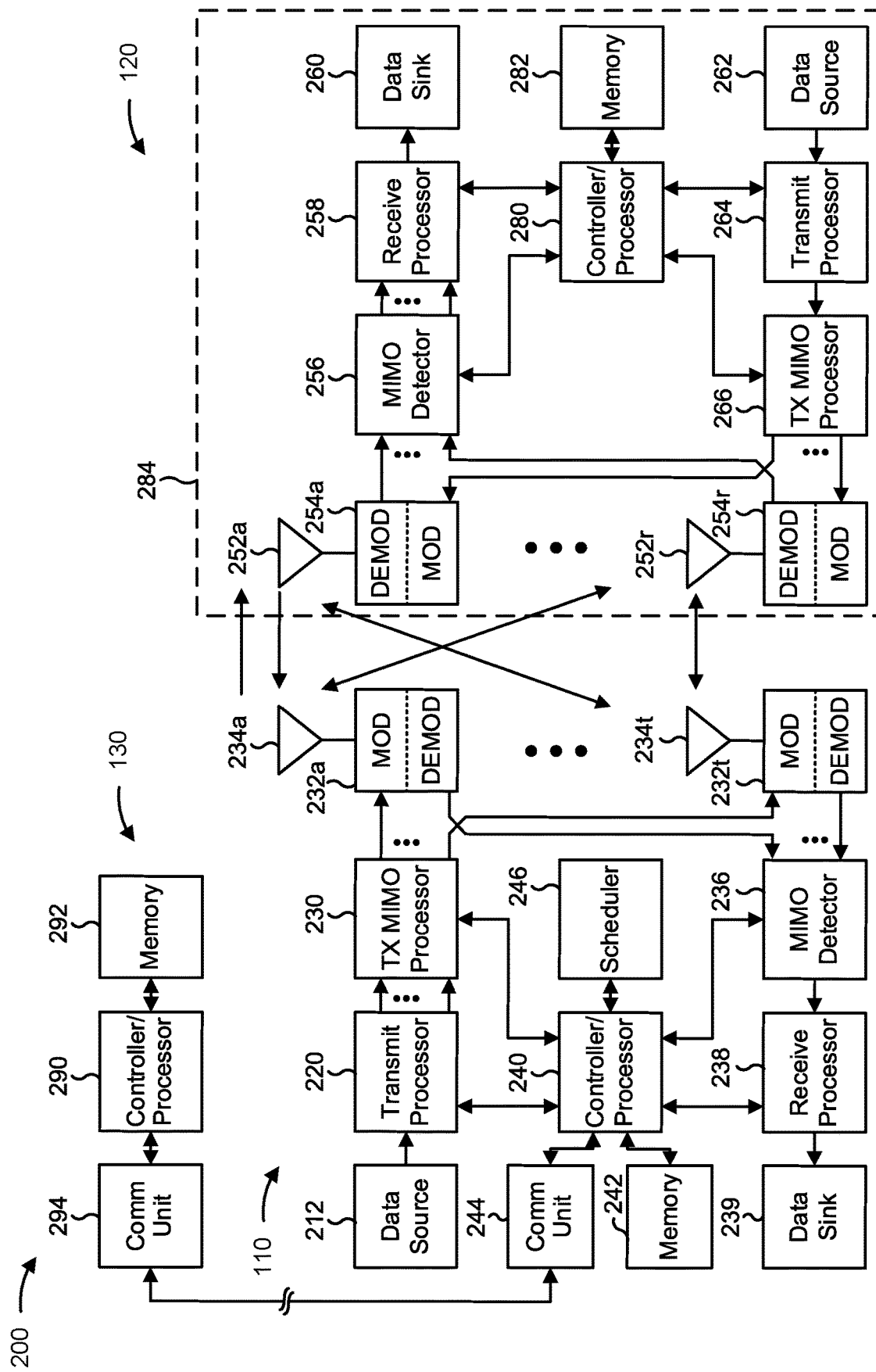
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-14).

The controller/processor 240 of the base station 110, the controller/processor 280 of the UE 120, and/or any other component(s) of FIG. 2 may perform one or more techniques associated with signaling parameters for relay devices, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples. In some aspects, a network node or a distributed unit (DU) described herein is the base station 110, is included in the base station 110, or includes one or more components of the base station 110 shown in FIG. 2. Similarly, a network node or a central unit (CU) described herein is the base station 110, is included in the base station 110, or includes one or more components of the base station 110 shown in FIG. 2. In some aspects, a network node of a core network described herein is the network controller 130, is included in the network controller 130, or includes one or more components of the network controller 130 shown in FIG. 2.

In some aspects, a network node (e.g., DU 704a of FIGS. 7 and 8, base station 110, and/or apparatus 1200 of FIG. 12) may include means for determining at least one parameter associated with use of a relay device to forward data between the network node and one or more wireless devices, the at least one parameter including a use time associated with the relay device, an amount of data associated with the relay device, or a combination thereof (e.g., using transmit processor 220, TX MIMO processor 230, receive processor 238, controller/processor 240, memory 242, and/or scheduler 246); and/or means for transmitting, to a central network node (e.g., CU 704b of FIGS. 7 and 8, apparatus 1300 of FIG. 13, core network 706 of FIGS. 7 and 8, and/or apparatus 1400 of FIG. 14), the at least one parameter (e.g., using transmit processor 220, TX MIMO processor 230, modem 232, antenna 234, controller/processor 240, memory 242, and/or scheduler 246).

In some aspects, a first network node (e.g., CU 704b of FIGS. 7 and 8, base station 110, and/or apparatus 1300 of FIG. 13) may include means for receiving, from a second network node (e.g., DU 704a of FIGS. 7 and 8, base station 110, and/or apparatus 1200 of FIG. 12), at least one parameter associated with use of a relay device to forward data between the second network node and one or more wireless devices, the at least one parameter including a use time associated with the relay device, an amount of data associated with the relay device, or a combination thereof (e.g., using antenna 234, modem 232, MIMO detector 236, receive processor 238, controller/processor 240, memory 242, and/or scheduler 246); and/or means for transmitting, to a central network node, the at least one parameter (e.g., using transmit processor 220, TX MIMO processor 230, modem 232, antenna 234, controller/processor 240, memory 242, and/or scheduler 246).

In some aspects, a first network node (e.g., core network 706 of FIGS. 7 and 8, network controller 130, and/or apparatus 1400 of FIG. 14) may include means for receiving, from a second network node (e.g., DU 704a of FIGS. 7 and 8, apparatus 1200 of FIG. 12, CU 704b of FIGS. 7 and 8, and/or apparatus 1300 of FIG. 13), at least one parameter associated with use of a relay device to forward data with one or more wireless devices, the at least one parameter including a use time associated with the relay device, an amount of data associated with the relay device, or a combination thereof (e.g., using antenna 234, modem 232, MIMO detector 236, receive processor 238, controller/processor 240, memory 242, and/or scheduler 246); and/or means for determining, based at least in part on the at least one parameter, a payment amount associated with the relay device (e.g., using transmit processor 220, TX MIMO processor 230, receive processor 238, controller/processor 240, memory 242, and/or scheduler 246).

In some aspects, a relay device (e.g., relay device 510 of FIGS. 7 and 8 and/or UE 120) may include means for receiving, from a network (e.g., DU 704*a* of FIGS. 7 and 8, apparatus 1200 of FIG. 12, CU 704*b* of FIGS. 7 and 8, and/or apparatus 1300 of FIG. 13), data intended for one or more wireless devices (e.g., using antenna 252, modem 254, MIMO detector 256, receive processor 258, controller/processor 280, and/or memory 282); means for forwarding the data to the one or more wireless devices (e.g., using antenna 252, modem 254, transmit processor 264, TX MIMO processor 266, controller/processor 280, and/or memory 282); and/or means for receiving, from the network, an indication of a payment amount associated with the relay device, wherein the payment amount is based at least in part on a use time associated with the relay device, an amount of data associated with the relay device, or a combination thereof (e.g., using antenna 252, modem 254, MIMO detector 256, receive processor 258, controller/processor 280, and/or memory 282).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
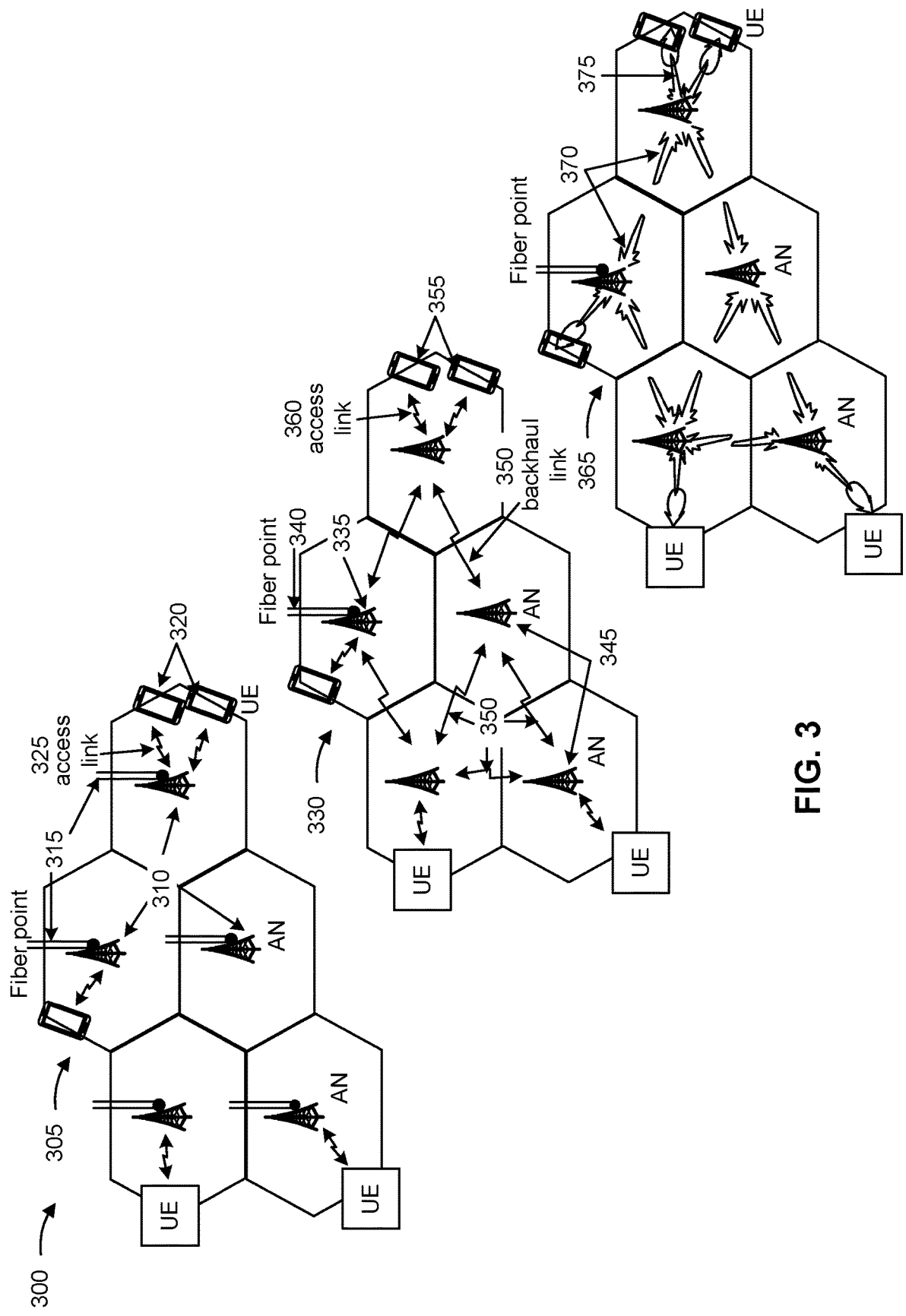
FIG. 3 is a diagram illustrating an example of radio access networks, in accordance with the present disclosure.

FIG. 3 is a diagram illustrating examples 300 of radio access networks, in accordance with the present disclosure. As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
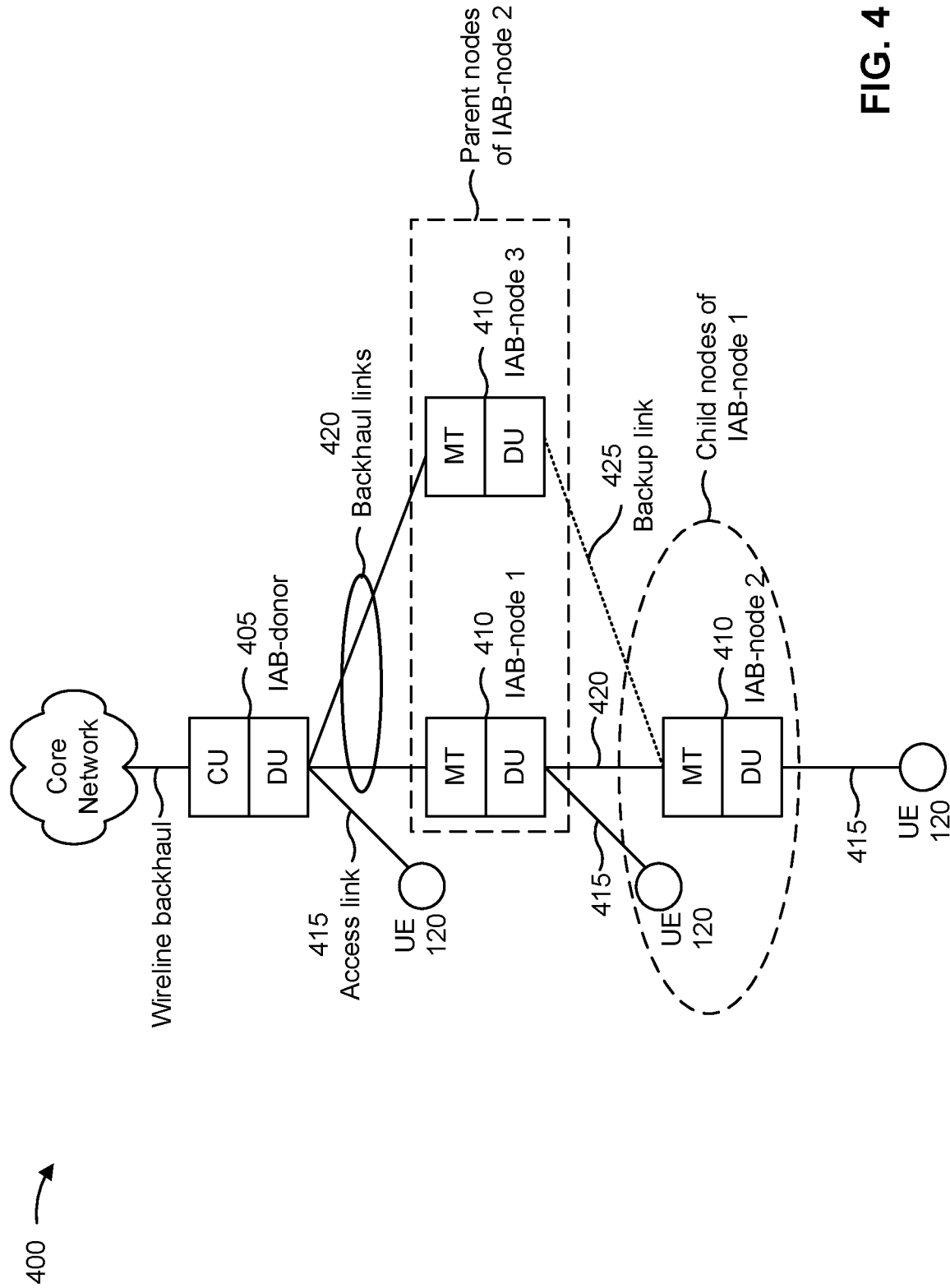
FIG. 4 is a diagram illustrating an example of integrated access and backhaul (IAB) network architecture, in accordance with the present disclosure.

FIG. 4 is a diagram illustrating an example 400 of an IAB network architecture, in accordance with the present disclosure. As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a CU, which may perform access node controller (ANC) functions and/or AMF functions. The CU may configure a DU of the IAB donor 405 and/or may configure one or more IAB nodes 410 (e.g., a mobile termination (MT) unit and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB node 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

As indicated above, FIG. 4 is provided as an example. Other examples may differ from what is described with regard to FIG. 4.

Figure 5:
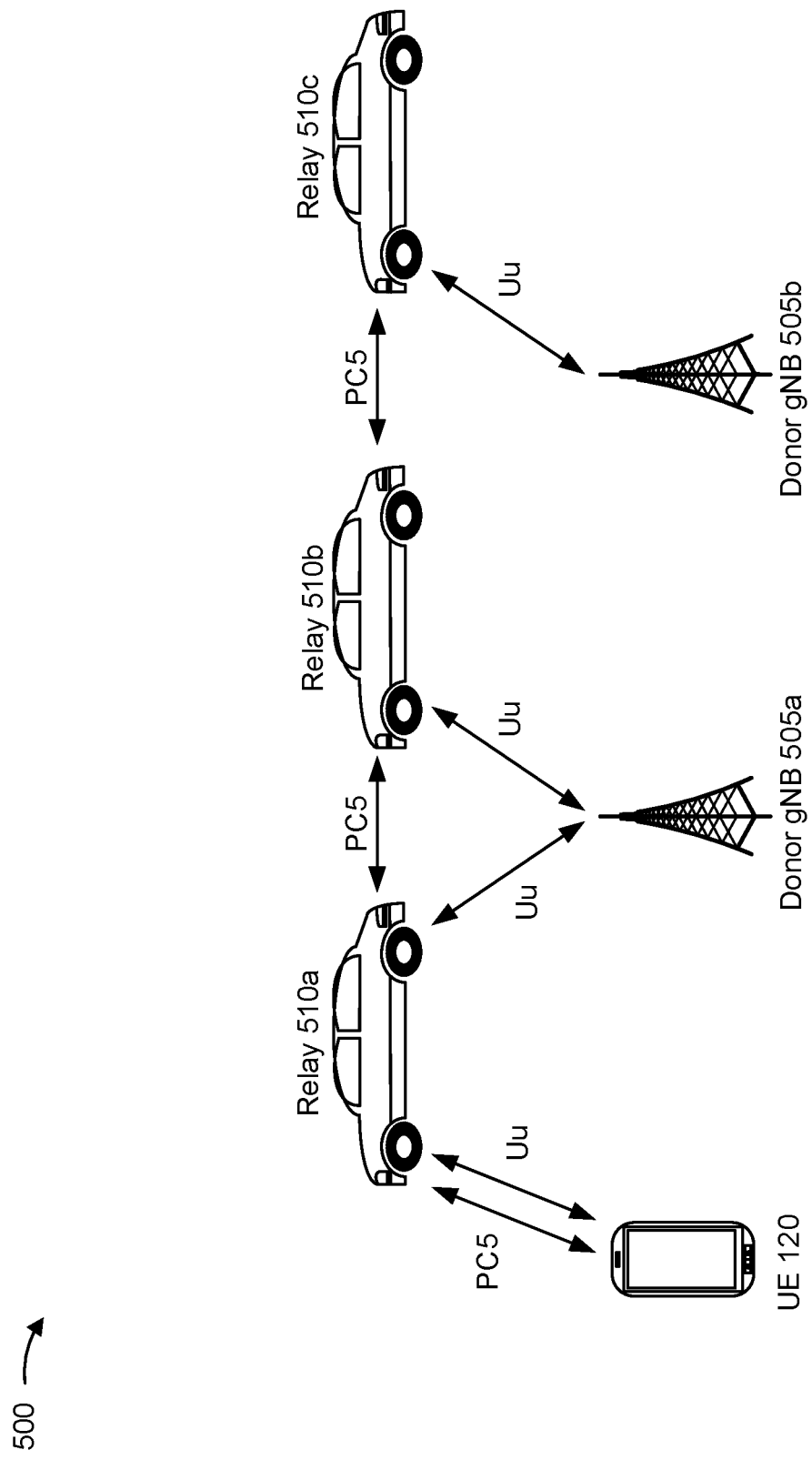
FIG. 5 is a diagram illustrating an example of a wireless network using relay devices, in accordance with the present disclosure.

FIG. 5 is a diagram illustrating an example 500 of wireless network using relay devices 510, in accordance with the present disclosure. In example 500, one or more base stations (e.g., donor gNB 505a and/or donor gNB 505b) may use one or more relay devices (e.g., relay device 510a, relay device 510b, and/or relay device 510c) to extend coverage of a wireless network (e.g., wireless network 100 of FIG. 1). Accordingly, the one or more base stations may use the relay devices to serve UE 120 and/or additional UEs. In some aspects, the one or more base stations may comprise one or more DUs of an IAB network (e.g., as described in connection with FIG. 4) that are supported by one or more CUs.

As shown in FIG. 5, the relay devices 510a, 510b, and/or 510c may include vehicles and/or other mobile devices. Additionally, or alternatively, the relay devices 510a, 510b, and/or 510c may include stationary devices, such as IAB nodes each including an MT unit (e.g., as described in connection with FIG. 4).

As further shown in FIG. 5, the donor gNBs 505a and/or 505b may use Uu interfaces to communicate with the relay devices 510a, 510b, and/or 510c (e.g., according to 3GPP specifications and/or another standard). Similarly, the relay devices 510a, 510b, and/or 510c may use Uu interfaces to communicate with the UE 120 and/or additional UEs. Additionally, or alternatively, the relay devices 510a, 510b, and/or 510c may use a PC5 interface to communicate with the UE 120 and/or additional UEs (e.g., by establishing one or more sidelink channels with the UE 120 and/or additional UEs).

As further shown in FIG. 5, the relay devices 510a, 510b, and/or 510c may use PC5 interfaces to communicate with each other (e.g., by establishing one or more sidelink channels between the relay devices 510a, 510b, and/or 510c). Additionally, or alternatively, the relay devices 510a, 510b, and/or 510c may use Uu interfaces to communicate with each other (e.g., according to 3GPP specifications and/or another standard). For example, the relay devices 510a, 510b, and/or 510c may comprise IAB nodes on a multi-hop network (e.g., as described in connection with FIG. 4).

As indicated above, FIG. 5 is provided as an example. Other examples may differ from what is described with respect to FIG. 5.

Figure 6A:
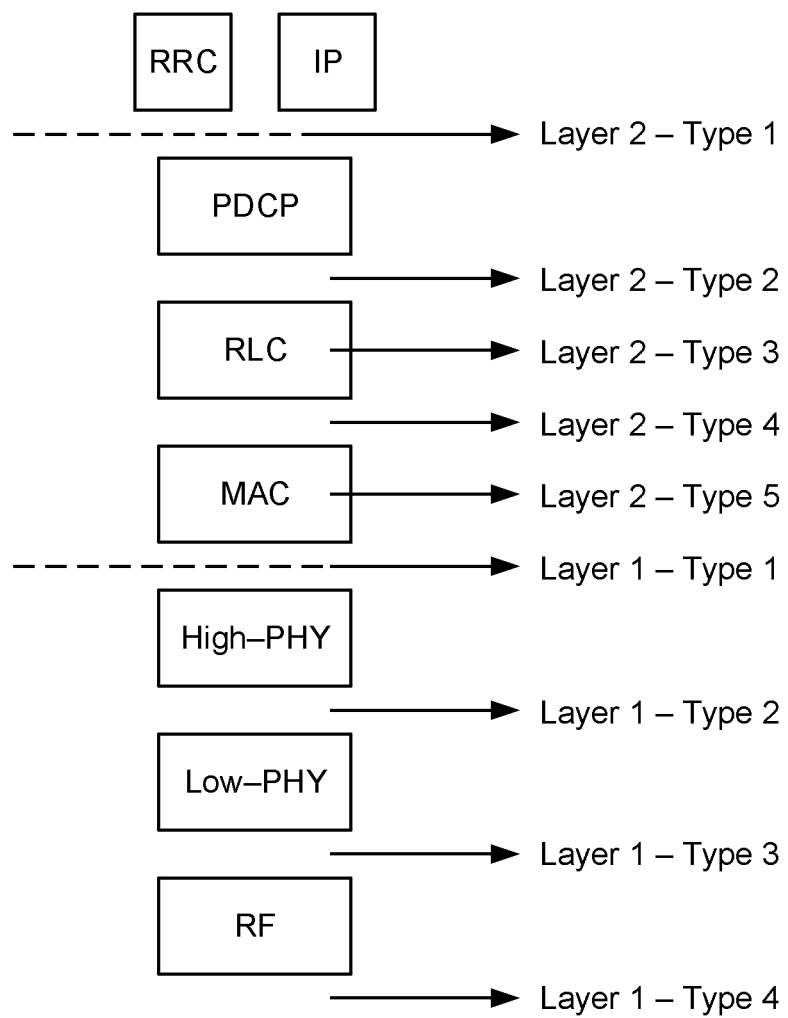
FIGS. 6A and 6B are diagrams illustrating examples of relay devices, in accordance with the present disclosure.
Figure 6B:
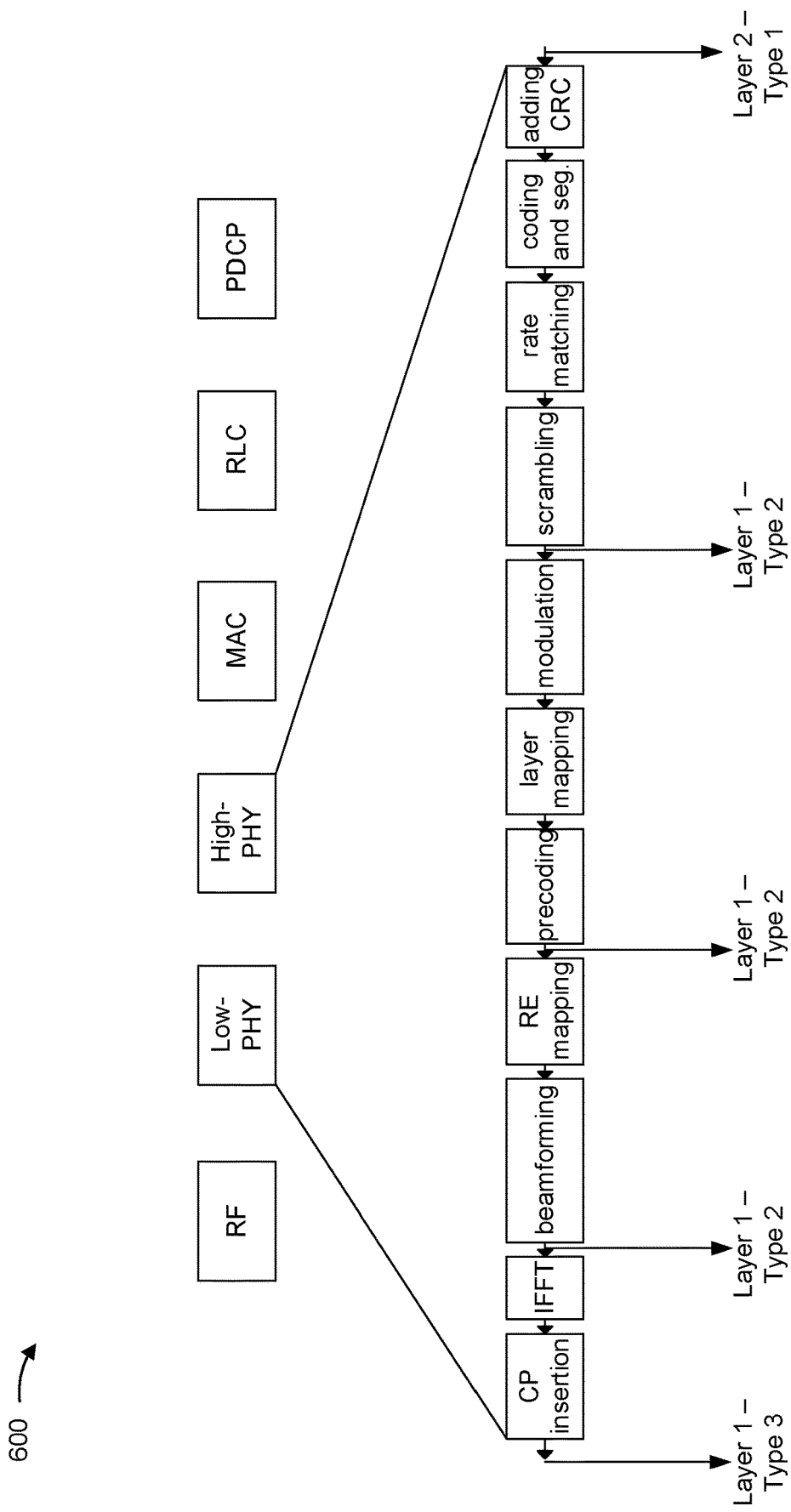

FIGS. 6A and 6B are diagrams illustrating an example 600 of relay devices (e.g., relay devices 510a, 510b, and/or 510c of FIG. 5), in accordance with the present disclosure. A base station (e.g., donor gNBs 505a and/or 505b) and/or DU (e.g., as described in connection with FIG. 4) may perform functions for the RRC layer and the Internet protocol (IP) layer when using a relay device. In some aspects, as described above, the base station and/or DU may perform additional functions based at least in part on capabilities of the relay device.

As shown in FIG. 6A, relay devices may have a layer and a type depending on which functions the relay device performs. For example, a layer 2 relay device may perform some functions at the medium access control (MAC) layer (for layer 2-type 5 relay devices) or all functions at the MAC layer (for layer 2-type 4 relay devices). Additionally, a layer 2 relay device may perform some functions at the radio link control (RLC) layer (for layer 2-type 3 relay devices) or all functions at the RLC layer (for layer 2-type 2 relay devices). Additionally, layer 2-type 1 relay devices may perform functions at the packet data convergence protocol (PDCP) layer.

As further shown in FIG. 6A, layer 1-type 4 relay devices may include analog repeaters (e.g., amplify-forward repeaters) that perform little or no processing of signals from the base station and/or DU. On the other hand, layer 1-type 3 relay devices may perform functions at the radio frequency (RF) layer. Additionally, layer 1-type 2 relay devices may perform lower-level functions (e.g., as described in connection with FIG. 6B) at the physical (PHY) layer, and layer 1-type 1 relay devices may additionally perform higher-level functions (e.g., as described in connection with FIG. 6B) at the PHY layer.

As shown in FIG. 6B, lower-level functions performed by layer 1-type 2 relay devices may include some or all of: cyclic prefix (CP) insertion, inverse fast Fourier transform (IFFT), beamforming, resource element (RE) mapping, precoding, layer mapping, and/or modulation. Additionally, higher-level functions performed by layer 1-type 3 relay devices may include some or all of: scrambling, rate matching, coding and segmentation, and/or adding cyclic redundancy checksums (CRCs).

In some situations, a DU may configure a relay device to serve one or more UEs. Accordingly, the DU may be aware of an amount of time for which the relay device was used and/or an amount of data transmitted through the relay device. However, the relay device may have separately registered with a core network serving the DU. Accordingly, the core network is unaware of the amount of time for which the relay device was used and/or the amount of data transmitted through the relay device.

Some techniques and apparatuses described herein provide for signaling between a DU (e.g., DU 704a of FIG. 7) and a core network (e.g., core network 706) associated with a time of use and/or an amount of data associated with a relay device (e.g., relay device 510). In some aspects, the signaling may use a CU (e.g., CU 704b of FIG. 7) between the DU 704a and the core network 706. The core network 706 may use the time of use and/or the amount of data to more accurately communicate with the relay device 510. For example, the core network 706 may more accurately determine and provide a payment amount and/or other incentive to the relay device 510 based at least in part on the time of use and/or the amount of data.

As indicated above, FIGS. 6A and 6B are provided as examples. Other examples may differ from what is described with respect to FIGS. 6A and 6B.

Figure 7:
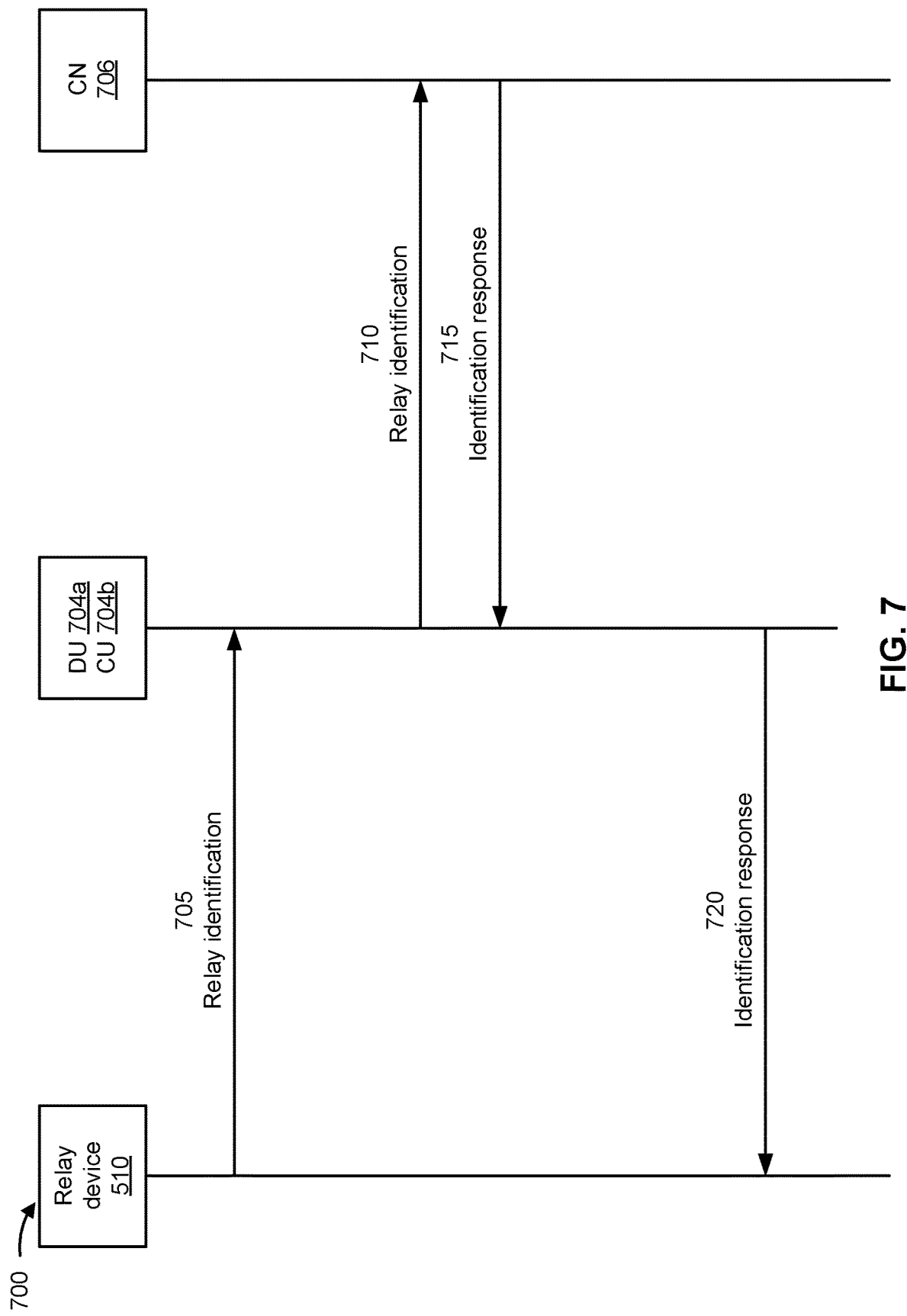
FIG. 7 is a diagram illustrating an example associated with registering a relay device with a core network, in accordance with the present disclosure.

FIG. 7 is a diagram illustrating an example 700 associated with registering a relay device with a core network, in accordance with the present disclosure. As shown in FIG. 7, example 700 includes communication between a relay device 510, a base station (e.g., including a DU 704a and a CU 704b), and a core network 706. In some aspects, the relay device 510, the DU 704a, and the CU 704b may be included in a wireless network, such as wireless network 100. In some aspects, the CU 704b may communicate with the core network 706 on a wired backhaul and/or a wireless backhaul.

As shown in connection with reference number 705, the relay device 510 may transmit, and the base station may receive, an identification of the relay device 510. For example, the identification may be transmitted as part of a registration procedure between the relay device 510 and the core network 706.

In some aspects, the identification may include an establishmentCause data structure in an RRCSetupRequest message (e.g., as defined in 3GPP specifications and/or another standard). Although the description focuses on the establishmentCause data structure and the RRCSetupRequest message, the description similarly applies to other data structures and/or other messages. In some aspects, the establishmentCause data structure may further indicate a layer and a type (e.g., as described in connection with FIGS. 6A and 6B) associated with the relay device 510.

As shown in connection with reference number 710, the base station may transmit, and the core network 706 may receive, the identification of the relay device 510. For example, an AMF of the core network 706 may receive the identification. In some aspects, the base station may copy the establishmentCause data structure (e.g., received as described in connection with reference number 705) into an RRCSetupRequest message transmitted to the core network 706.

As shown in connection with reference number 715, the core network 706 may transmit, and the base station may receive, a response to the identification. For example, an AMF of the core network 706 may transmit the response. In some aspects, the response may include an acknowledgement signal. Additionally, in some aspects, the core network 706 may indicate an operation mode for the relay device 510 in the response. For example, the response may indicate a layer and a type (e.g., as described in connection with FIGS. 6A and 6B) according to which the relay device 510 should operate. Accordingly, the core network 706 may instruct the relay device 510 to operate using fewer functions than the panoply of functions that the relay device 510 is capable of performing.

In some aspects, and as shown in connection with reference number 720, the base station may further transmit, and the relay device 510 may receive, the response.

In some aspects, the relay device 510 may register directly with the core network 706 (e.g., using non-access stratum (NAS) signaling) in lieu of using the base station. Similarly, the core network 706 may transmit a response (e.g., as described in connection with reference number 715) directly to the relay device 510 (e.g., using NAS signaling) in lieu of using the base station.

As indicated above, FIG. 7 is provided as an example. Other examples may differ from what is described with respect to FIG. 7.

Figure 8:
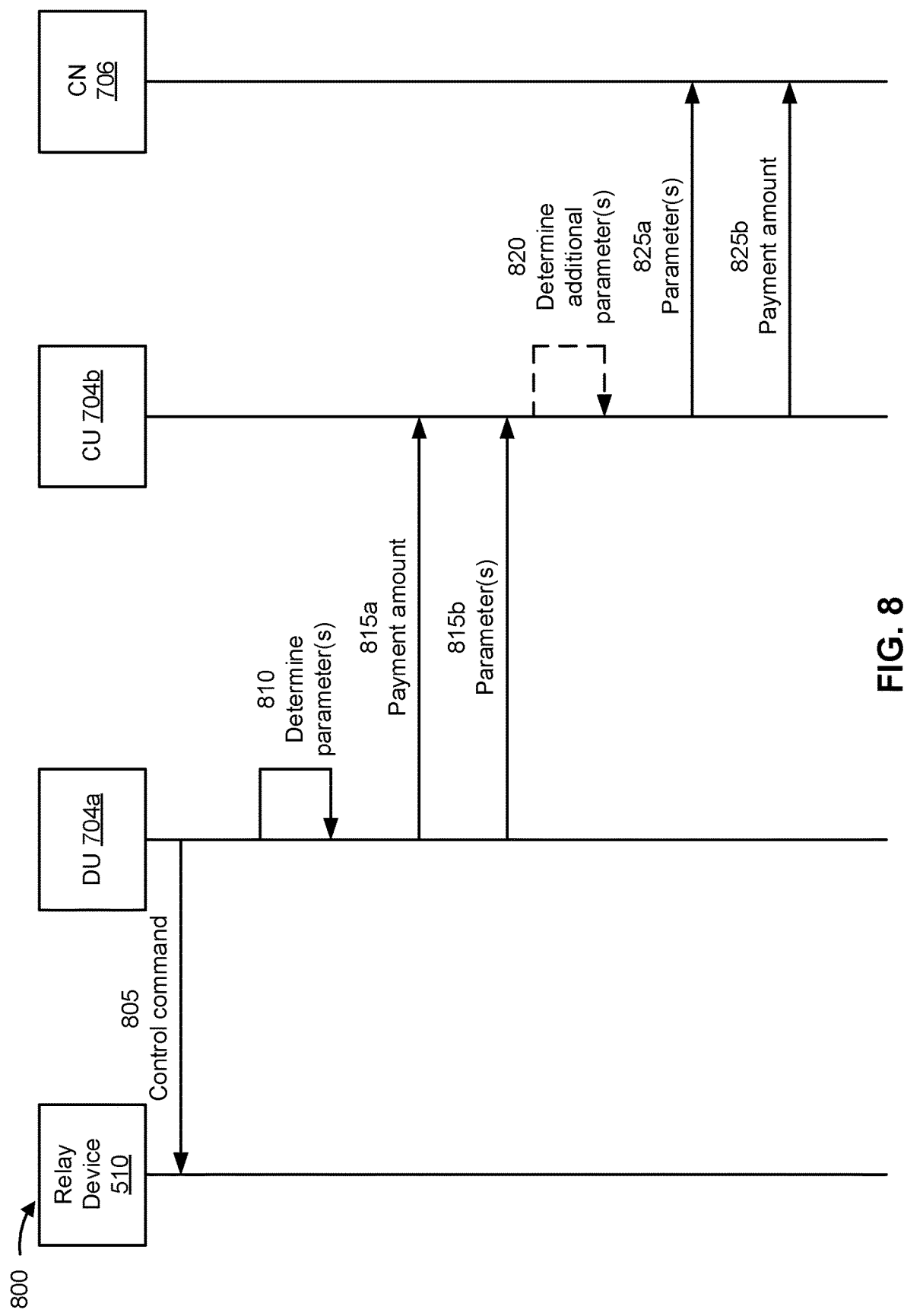
FIG. 8 is a diagram illustrating an example associated with signaling parameters for relay devices, in accordance with the present disclosure.

FIG. 8 is a diagram illustrating an example 800 associated with signaling parameters for relay devices, in accordance with the present disclosure. As shown in FIG. 8, example 800 includes communication between a relay device 510 and a DU 704a. In some aspects, the relay device 510 and the DU 704a may be included in a wireless network, such as wireless network 100. Additionally, the DU 704a may be supported by a CU 704b (e.g., as described in connection with FIG. 4). In some aspects, the DU 704a and the CU 704b may be integrated (e.g., as shown in FIG. 7) or may be at least partially separated physically (e.g., separated in hardware), virtually (e.g., separated in software), and/or logically. As further shown in FIG. 8, example 800 includes communication between the CU 704b and a core network 706. In some aspects, the CU 704b and the core network 706 may communicate on a wired backhaul and/or a wireless backhaul.

As shown in connection with reference number 805, the DU 704a may transmit, and the relay device 510 may receive, at least one control command to forward data between the DU 704a and one or more wireless devices (e.g., UEs, MT units, and/or other wireless devices). For example, the DU 704a may schedule transmissions to the one or more wireless devices through the relay device 510. Accordingly, the DU 704a may use a Uu interface with the relay device 510 to transmit data for relaying over a Uu interface or a PC5 interface to the one or more wireless devices (e.g., as described in connection with FIG. 5). Additionally, or alternatively, the DU 704a may scheduling transmissions from the one or more wireless devices through the relay device 510. Accordingly, the DU 704a may use a Uu interface with the relay device 510 to receive data that was relayed to the relay device 510, over a Uu interface or a PC5 interface, from the one or more wireless devices (e.g., as described in connection with FIG. 5).

In some aspects, the at least one control command may include scheduling information for forwarding the data between the DU 704a and the one or more wireless devices. For example, the DU 704a may transmit downlink control information (DCI), sidelink control information (SCI), and/or other scheduling information to the relay device 510. Additionally, or alternatively, the at least one control command may include an instruction message to forward the data between the network node and the one or more wireless devices. For example, the DU 704a may transmit a command to the relay device 510 to establish an RRC connection, a sidelink channel, and/or other connection with the one or more wireless devices.

Accordingly, the relay device 510 may forward data that was received from the DU 704a to the one or more wireless devices. For example, the relay device 510 may register with the core network 706 and/or the DU 704a in exchange for incentives based at least in part on a use time associated with the relay device 510 forwarding data to the one or more wireless devices, an amount of data associated with the relay device 510 and forwarded to the one or more wireless devices, or a combination thereof.

As shown in connection with reference number 810, the DU 704a may determine at least one parameter associated with use of the relay device 510 to forward data between the network node and the one or more wireless devices. The at least one parameter may include a use time associated with the relay device 510, an amount of data associated with the relay device 510, or a combination thereof. For example, the DU 704a may determine the use time based at least in part on when the relay device 510 established a connection with the one or more wireless devices (e.g., as described above) and when the relay device 510 disconnected from the one or more wireless devices. As an alternative, the DU 704a may determine the use time based at least in part on one or more amounts of time between the DU 704a transmitting data to the relay device 510 and the DU 704a receiving an acknowledgement signal from the relay device 510 that indicates the one or more wireless devices received the data. In some aspects, the DU 704a may additionally or alternatively determine the amount of data based at least in part on a total amount of information transmitted to the relay device 510, an amount of information transmitted to the one or more wireless devices through the relay device 510 (e.g., not including control information transmitted to the relay device 510), and/or an amount of data transmitted to the one or more wireless devices through the relay device 510 (e.g., not including control information transmitted to the relay device 510 and not including control information transmitted to the one or more wireless devices), among other examples. Accordingly, in some aspects, the determining may be based at least in part on the at least one control command (e.g., as described in connection with reference number 805).

In some aspects, the at least one parameter may additionally include a type associated with the relay device 510 (e.g., a layer and/or a type as described in connection with FIGS. 6A and 6B), a time of day associated with the data forwarded between the DU 704a and the one or more wireless devices, geographic information associated with the relay device 510, a type associated with the data forwarded between the DU 704a and the one or more wireless devices, an indication of an uplink or a downlink, an amount of power consumed by the relay device 510, or a combination thereof.

In some aspects, the DU 704a may determine a payment amount associated with the relay device 510. The DU 704a may determine the payment amount based at least in part on any one of the parameters described above. Additionally, or alternatively, the DU 704a may receive (e.g., from the core network 706 via the CU 704b) one or more variables used to determine the payment amount.

In some aspects, the DU 704a may use a type associated with the relay device 510 (e.g., a layer and/or a type as described in connection with FIGS. 6A and 6B) in combination with the use time and/or the amount of data to determine the payment amount. For example, the DU 704a may apply a higher rate to the use time and/or the amount of data for types that include more processing (e.g., a higher rate for layer 2 relay devices as compared with layer 1 relay devices, a higher rate for layer 1-type 1 relay devices as compared with layer 1-type 2 relay devices, among similar examples). Additionally, or alternatively, the DU 704a may use a time of day associated with the data forwarded between the DU 704a and the one or more wireless devices in combination with the use time and/or the amount of data to determine the payment amount. For example, the DU 704a may apply a higher rate to the use time and/or the amount of data for times that are busier (e.g., a higher rate for evening relaying as compared to overnight relaying) and/or a higher rate to the use time and/or the amount of data for times where supply is lower (e.g., a higher rate for overnight relaying as compared to morning relaying), among other examples. Additionally, or alternatively, the DU 704a may use geographic information associated with the relay device 510 in combination with the use time and/or the amount of data to determine the payment amount. For example, the DU 704a may apply a higher rate to the use time and/or the amount of data for geographic areas that are busier (e.g., a higher rate for relay devices in urban areas as compared with suburban areas) and/or a higher rate to the use time and/or the amount of data for times where supply is lower (e.g., a higher rate for relay devices in rural areas as compared with suburban areas), among other examples. Additionally, or alternatively, the DU 704a may use a type associated with the data forwarded between the DU 704a and the one or more wireless devices, in combination with the use time and/or the amount of data, to determine the payment amount. For example, the DU 704a may apply a higher rate to the use time and/or the amount of data for data that relies on a higher quality of service (QoS) (e.g., a higher rate for voice data as compared with text data). Additionally, or alternatively, the DU 704a may use an indication of an uplink or a downlink in combination with the use time and/or the amount of data to determine the payment amount. For example, the DU 704a may apply a higher rate to the use time and/or the amount of data for data sent to the one or more wireless devices on a downlink as compared with data received from the one or more wireless devices on an uplink. As an alternative, the DU 704a may apply a lower rate to the use time and/or the amount of data for data sent to the one or more wireless devices on a downlink as compared with data received from the one or more wireless devices on an uplink. Additionally, or alternatively, the DU 704a may use an amount of power consumed by the relay device 510 in combination with the use time and/or the amount of data to determine the payment amount. For example, the DU 704a may apply a higher rate to the use time and/or the amount of data for data that consumed more power as compared with data that consumed less power.

In some aspects, the DU 704a may additionally or alternatively use one or more types associated with the one or more wireless devices in combination with the use time and/or the amount of data to determine the payment amount.

For example, some wireless devices may be associated with the relay device 510 (e.g., sharing an owner; receiving free or discounted service, based at least in part on an association with the relay device 510, from a cell and/or network operator associated with the DU 704a; and/or otherwise associated with the relay device 510). Accordingly, a wireless device that is in a type associated with the relay device 510 may be associated with a lower rate (or even a zero rate) as compared with a rate for wireless devices that are in a type not associated with the relay device 510.

The DU 704a may combine any of the variables described above to determine the payment amount. For example, the DU 704a may select an initial rate based at least in part on one variable (e.g., as described above) and adjust the initial rate higher or lower based at least in part on one or more additional variables (e.g., as described above). As another example, the DU 704a may combine multiple variables (e.g., using a formula or other algorithm) to determine a rate to apply to the use time and/or the amount of data.

Accordingly, the DU 704a may transmit the payment amount additionally with or in lieu of the at least one parameter. In some aspects, the DU 704a may additionally transmit the payment amount to the relay device 510. Accordingly, the relay device 510 receives an indication of the payment amount in exchange for the relay device 510 forwarding data to the one or more wireless devices.

The DU 704a may transmit the at least one parameter periodically. Additionally, or alternatively, the DU 704a may transmit the at least one parameter on an on-demand basis. For example, the DU 704a may initiate transmission of the at least one parameter. As an alternative, the DU 704a may receive (e.g., from the CU 704b or from the core network 706 via the CU 704b) a request for the at least one parameter and transmit the at least one parameter based at least in part on the request.

As shown in connection with reference number 815a, the DU 704a may transmit, and the CU 704b may receive, the at least one parameter. In some aspects, as described above, at least one parameter may include a use time associated with the relay device 510, an amount of data associated with the relay device 510, or a combination thereof. Additionally, in some aspects, the at least one parameter may include a type associated with the relay device 510 (e.g., a layer and/or a type as described in connection with FIGS. 6A and 6B), a time of day associated with the data forwarded between the DU 704a and the one or more wireless devices, geographic information associated with the relay device 510, a type associated with the data forwarded between the DU 704a and the one or more wireless devices, an indication of an uplink or a downlink, an amount of power consumed by the relay device 510, or a combination thereof.

As an alternative, and as shown in connection with reference number 815b, the DU 704a may transmit, and the CU 704b may receive, an indication of the payment amount calculated by the DU 704a.

In some aspects, and as shown in connection with reference number 820, the CU 704b may further process the at least one parameter. In some aspects, the CU 704b may filter the at least one parameter from the DU 704a. For example, the DU 704a may provide one or more variables (e.g., as described above) in combination with the use time and/or the amount of data, and the CU 704b may filter out variables that the core network 706 will not use (e.g., to determine a payment amount). Additionally, or alternatively, the CU 704b may determine a payment amount associated with the relay device 510 (e.g., as described above). Accordingly, the relay device 510 may receive the indication of the payment amount, in exchange for the relay device 510 forwarding data to the one or more wireless devices, from the CU 704b.

As shown in connection with reference number 825a, the CU 704b may transmit, and the core network 706 may receive, the at least one parameter. For example, an AMF of the core network 706 may receive the at least one parameter. In some aspects, the CU 704b may forward the at least one parameter from the DU 704a to the core network 706. As an alternative, and as described above in connection with reference number 820, the CU 704b may filter the at least one parameter (and/or determine a payment amount) before transmitting to the core network 706. Accordingly, the relay device 510 may receive the indication of the payment amount, in exchange for the relay device 510 forwarding data to the one or more wireless devices, from the core network 706.

As an alternative, and as shown in connection with reference number 825b, the CU 704b may transmit, and the core network 706 may receive, an indication of the payment amount calculated by the CU 704b or the DU 704a.

By using techniques as described in connection with FIG. 8, the DU 704a may communicate at least one parameter, to the core network 706, associated with a time of use and/or an amount of data associated with the relay device 510. Accordingly, the core network 706 may use the time of use and/or the amount of data to more accurately communicate with the relay device 510. For example, the core network 706 may more accurately determine and provide a payment amount and/or other incentive to the relay device 510 based at least in part on the time of use and/or the amount of data.

As indicated above, FIG. 8 is provided as an example. Other examples may differ from what is described with respect to FIG. 8.

Figure 9:
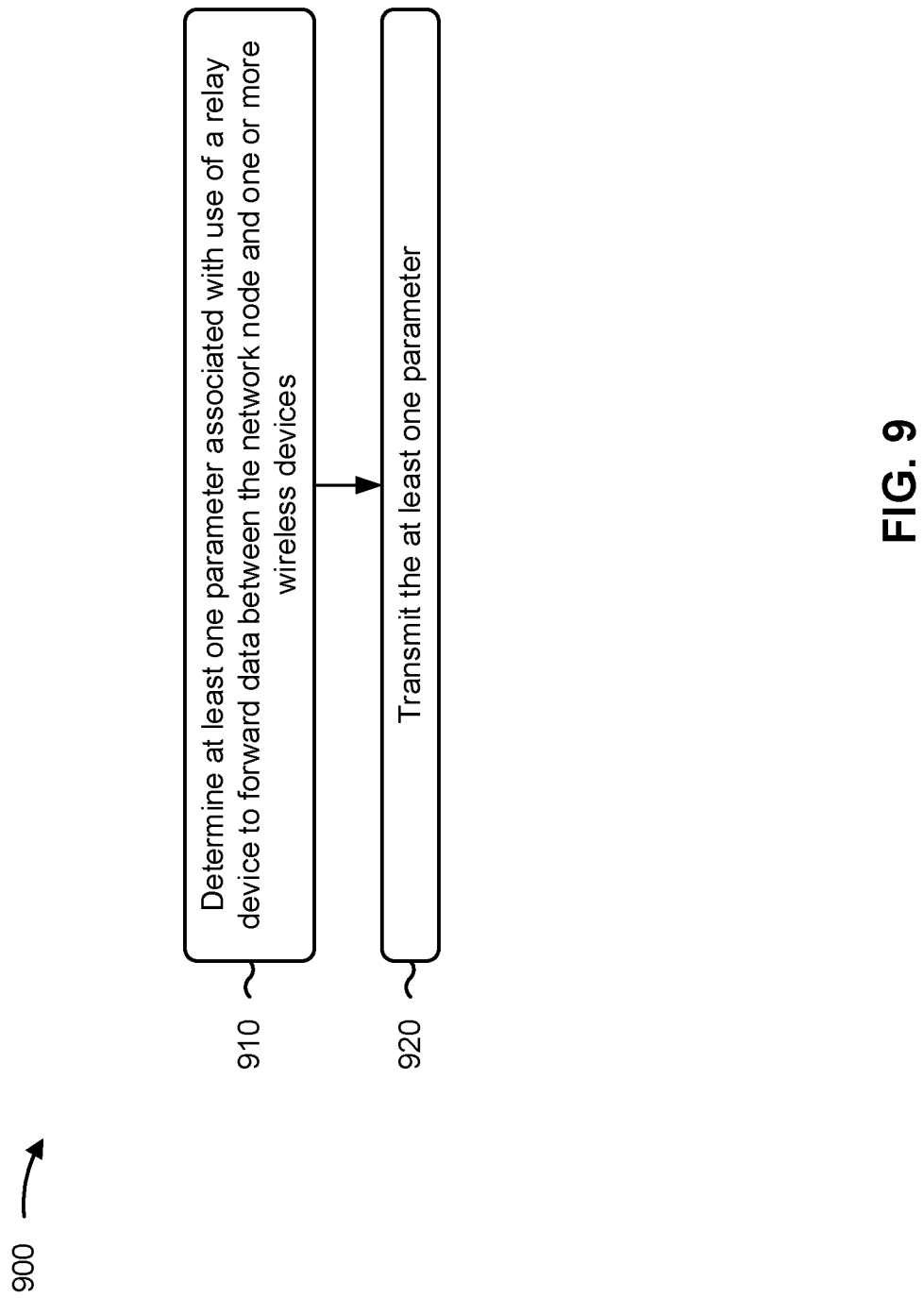
FIGS. 9, 10, and 11 are diagrams illustrating example processes associated with signaling parameters for relay devices, in accordance with the present disclosure.

FIG. 9 is a diagram illustrating an example process 900 performed, for example, by a network node, in accordance with the present disclosure. Example process 900 is an example where the network node (e.g., DU 704a of FIGS. 7 and 8, base station 110 of FIG. 1, and/or apparatus 1200 of FIG. 12) performs operations associated with signaling parameters for relay devices.

As shown in FIG. 9, in some aspects, process 900 may include determining at least one parameter associated with use of a relay device to forward data between the network node and one or more wireless devices (e.g., UEs 120) (block 910). For example, the network node (e.g., using determination component 1208, depicted in FIG. 12) may determine at least one parameter associated with use of a relay device to forward data between the network node and one or more wireless devices, as described herein, for example, with reference to FIG. 8. In some aspects, the at least one parameter includes a use time associated with the relay device, an amount of data associated with the relay device, or a combination thereof.

As further shown in FIG. 9, in some aspects, process 900 may include transmitting, to a central network node (e.g., CU 704b of FIGS. 7 and 8, apparatus 1300 of FIG. 13, core network 706 of FIGS. 7 and 8, and/or apparatus 1400 of FIG. 14), the at least one parameter (block 920). For example, the network node (e.g., using transmission component 1204, depicted in FIG. 12) may transmit, to a central network node, the at least one parameter, as described herein, for example, with reference to FIG. 8.

Process 900 may include additional aspects, such as any single aspect or any combination of aspects described below and/or in connection with one or more other processes described elsewhere herein.

In a first aspect, the network node includes a DU, and the central network node includes a CU.

In a second aspect, alone or in combination with the first aspect, the network node includes a CU, and the central network node is at least a portion of a core network.

In a third aspect, alone or in combination with one or more of the first and second aspects, process 900 further includes transmitting (e.g., using transmission component 1204), to the relay device, at least one control command to forward the data between the network node and the one or more wireless devices, such that the at least one parameter is determined based at least in part on the at least one control command.

In a fourth aspect, alone or in combination with one or more of the first through third aspects, the at least one control command includes scheduling information for forwarding the data between the network node and the one or more wireless devices.

In a fifth aspect, alone or in combination with one or more of the first through fourth aspects, the at least one control command includes an instruction message to forward the data between the network node and the one or more wireless devices.

In a sixth aspect, alone or in combination with one or more of the first through fifth aspects, the at least one parameter further includes at least one of a type associated with the relay device, a time of day associated with the data forwarded between the network node and the one or more wireless devices, geographic information associated with the relay device, a type associated with the data forwarded between the network node and the one or more wireless devices, an indication of an uplink or a downlink, an amount of power consumed by the relay device, or a combination thereof.

In a seventh aspect, alone or in combination with one or more of the first through sixth aspects, the at least one parameter includes a payment amount associated with the relay device.

In an eighth aspect, alone or in combination with one or more of the first through seventh aspects, determining the at least one parameter includes determining the payment amount (e.g., using incentive component 1210, depicted in FIG. 12) based at least in part on the use time associated with the relay device, the amount of data associated with the relay device, a type associated with the relay device, a time of day associated with the data forwarded between the network node and the one or more wireless devices, geographic information associated with the relay device, a type associated with the data forwarded between the network node and the one or more wireless devices, an indication of an uplink or a downlink, an amount of power consumed by the relay device, or a combination thereof.

In a ninth aspect, alone or in combination with one or more of the first through eighth aspects, process 900 further includes receiving (e.g., using reception component 1202, depicted in FIG. 12), from the central network node, one or more variables used to determine the payment amount.

In a tenth aspect, alone or in combination with one or more of the first through ninth aspects, process 900 further includes transmitting (e.g., using transmission component 1204), to the relay device, the payment amount.

In an eleventh aspect, alone or in combination with one or more of the first through tenth aspects, the at least one parameter is transmitted periodically.

In a twelfth aspect, alone or in combination with one or more of the first through eleventh aspects, process 900 further includes receiving (e.g., using reception component 1202), from the central network node, a request for the at least one parameter, such that the at least one parameter is transmitted based at least in part on receiving the request.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
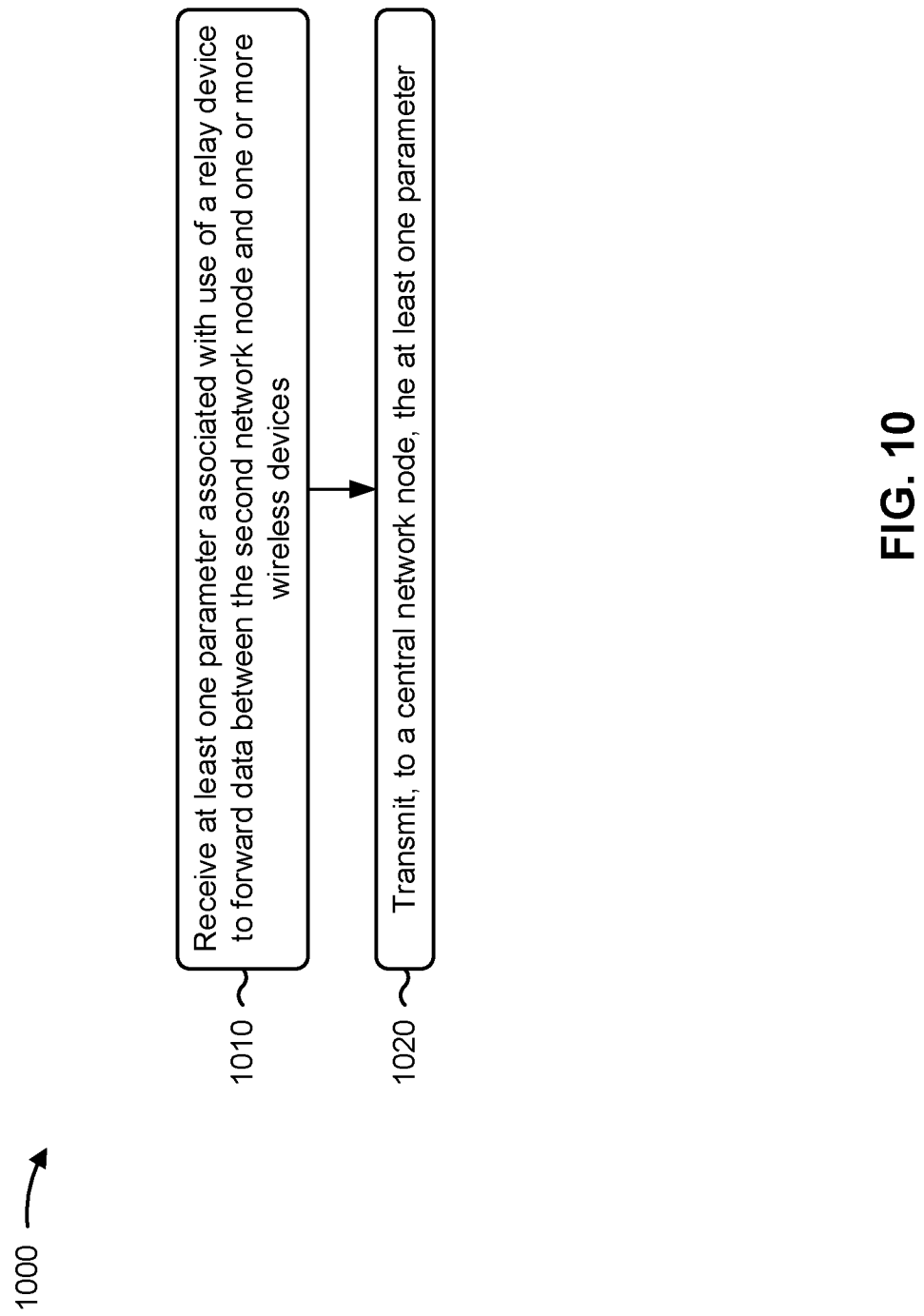

FIG. 10 is a diagram illustrating an example process 1000 performed, for example, by a first network node, in accordance with various aspects of the present disclosure. Example process 1000 is an example where the first network node (e.g., CU 704b of FIGS. 7 and 8, base station 110 of FIG. 1, and/or apparatus 1300 of FIG. 13) performs operations associated with signaling parameters for relay devices.

As shown in FIG. 10, in some aspects, process 1000 may include receiving, from a second network node (e.g., DU 704a of FIGS. 7 and 8 and/or apparatus 1200 of FIG. 12), at least one parameter associated with use of a relay device to forward data between the second network node and one or more wireless devices (e.g., UEs 120) (block 1010). For example, the first network node (e.g., using reception component 1302, depicted in FIG. 13) may receive, from the second network node, at least one parameter associated with use of a relay device to forward data between the second network node and one or more wireless devices, as described herein, for example, with reference to FIG. 8. In some aspects, the at least one parameter includes a use time associated with the relay device, an amount of data associated with the relay device, or a combination thereof.

As further shown in FIG. 10, in some aspects, process 1000 may include transmitting, to a central network node (e.g., core network 706 of FIGS. 7 and 8 and/or apparatus 1400 of FIG. 14), the at least one parameter (block 1020). For example, the first network node (e.g., using transmission component 1304, depicted in FIG. 13) may transmit, to a central network node, the at least one parameter, as described herein, for example, with reference to FIG. 8.

Process 1000 may include additional aspects, such as any single aspect or any combination of aspects described below and/or in connection with one or more other processes described elsewhere herein.

In a first aspect, the first network node includes a CU and the second network node includes a DU.

In a second aspect, alone or in combination with the first aspect, the central network node is at least a portion of a core network.

In a third aspect, alone or in combination with one or more of the first and second aspects, the at least one parameter further includes at least one of a type associated with the relay device, a time of day associated with the data forwarded between the second network node and the one or more wireless devices, geographic information associated with the relay device, a type associated with the data forwarded between the second network node and the one or more wireless devices, an indication of an uplink or a downlink, an amount of power consumed by the relay device, or a combination thereof.

In a fourth aspect, alone or in combination with one or more of the first through third aspects, the at least one parameter includes a payment amount associated with the relay device.

In a fifth aspect, alone or in combination with one or more of the first through fourth aspects, process 1000 further includes determining the payment amount (e.g., using incentive component 1308, depicted in FIG. 13) based at least in part on the use time associated with the relay device, the amount of data associated with the relay device, a type associated with the relay device, a time of day associated with the data forwarded between the second network node and the one or more wireless devices, geographic information associated with the relay device, a type associated with the data forwarded between the second network node and the one or more wireless devices, an indication of an uplink or a downlink, an amount of power consumed by the relay device, or a combination thereof.

In a sixth aspect, alone or in combination with one or more of the first through fifth aspects, process 1000 further includes receiving (e.g., using reception component 1302), from the central network node, one or more variables used to determine the payment amount.

In a seventh aspect, alone or in combination with one or more of the first through sixth aspects, process 1000 further includes transmitting (e.g., using transmission component 1304), to the second network node, the payment amount.

In an eighth aspect, alone or in combination with one or more of the first through seventh aspects, the at least one parameter is received periodically.

In a ninth aspect, alone or in combination with one or more of the first through eighth aspects, process 1000 further includes transmitting (e.g., using transmission component 1304), to the second network node, a first request for the at least one parameter, such that the at least one parameter is received based at least in part on transmitting the first request.

In a tenth aspect, alone or in combination with one or more of the first through ninth aspects, process 1000 further includes receiving (e.g., using reception component 1302), from the central network node, a second request for the at least one parameter, such that the first request is transmitted based at least in part on receiving the second request.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
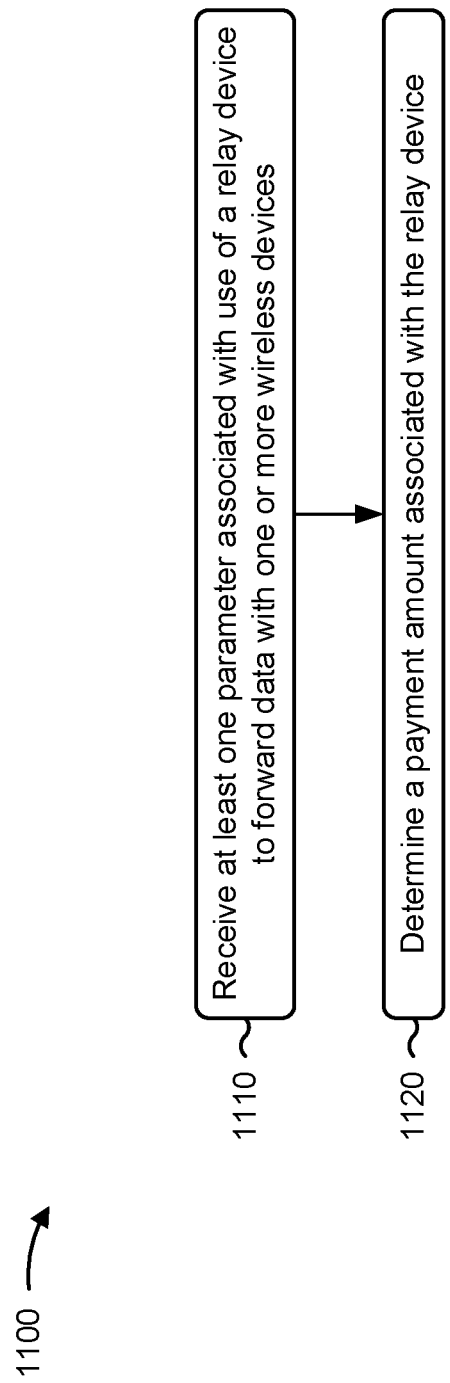

FIG. 11 is a diagram illustrating an example process 1100 performed, for example, by a first network node, in accordance with various aspects of the present disclosure. Example process 1100 is an example where the first network node (e.g., core network 706 of FIGS. 7 and 8 and/or apparatus 1400 of FIG. 14) performs operations associated with signaling parameters for relay devices.

As shown in FIG. 11, in some aspects, process 1100 may include receiving, from a second network node (e.g., CU 704*b* of FIGS. 7 and 8, base station 110 of FIG. 1, and/or apparatus 1300 of FIG. 13), at least one parameter associated with use of a relay device to forward data with one or more wireless devices (e.g., UEs 120) (block 1110). For example, the first network node (e.g., using reception component 1402, depicted in FIG. 14) may receive, from a second network node, at least one parameter associated with use of a relay device to forward data with one or more wireless devices, as described herein, for example, with reference to FIG. 8. In some aspects, the at least one parameter includes a use time associated with the relay device, an amount of data associated with the relay device, or a combination thereof.

As further shown in FIG. 11, in some aspects, process 1100 may include determining, based at least in part on the at least one parameter, a payment amount associated with the relay device (block 1120). For example, the first network node (e.g., using incentive component 1408, depicted in FIG. 14) may determine, based at least in part on the at least one parameter, a payment amount associated with the relay device, as described herein, for example, with reference to FIG. 8.

Process 1100 may include additional aspects, such as any single aspect or any combination of aspects described below and/or in connection with one or more other processes described elsewhere herein.

In a first aspect, the second network node includes a CU.

In a second aspect, alone or in combination with the first aspect, the first network node is at least a portion of a core network.

In a third aspect, alone or in combination with one or more of the first and second aspects, the at least one parameter further includes at least one of a type associated with the relay device, a time of day associated with the data forwarded with the one or more wireless devices, geographic information associated with the relay device, a type associated with the data forwarded with the one or more wireless devices, an indication of an uplink or a downlink, an amount of power consumed by the relay device, or a combination thereof.

In a fourth aspect, alone or in combination with one or more of the first through third aspects, process 1100 further includes transmitting (e.g., using transmission component 1404, depicted in FIG. 14), to the second network node, one or more variables used to determine the at least one parameter.

In a fifth aspect, alone or in combination with one or more of the first through fourth aspects, process 1100 further includes transmitting (e.g., using transmission component 1404), to the second network node, the payment amount.

In a sixth aspect, alone or in combination with one or more of the first through fifth aspects, the at least one parameter is received periodically.

In a seventh aspect, alone or in combination with one or more of the first through sixth aspects, process 1100 further includes transmitting (e.g., using transmission component 1404), to the second network node, a request for the at least one parameter, such that the at least one parameter is received based at least in part on transmitting the request.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
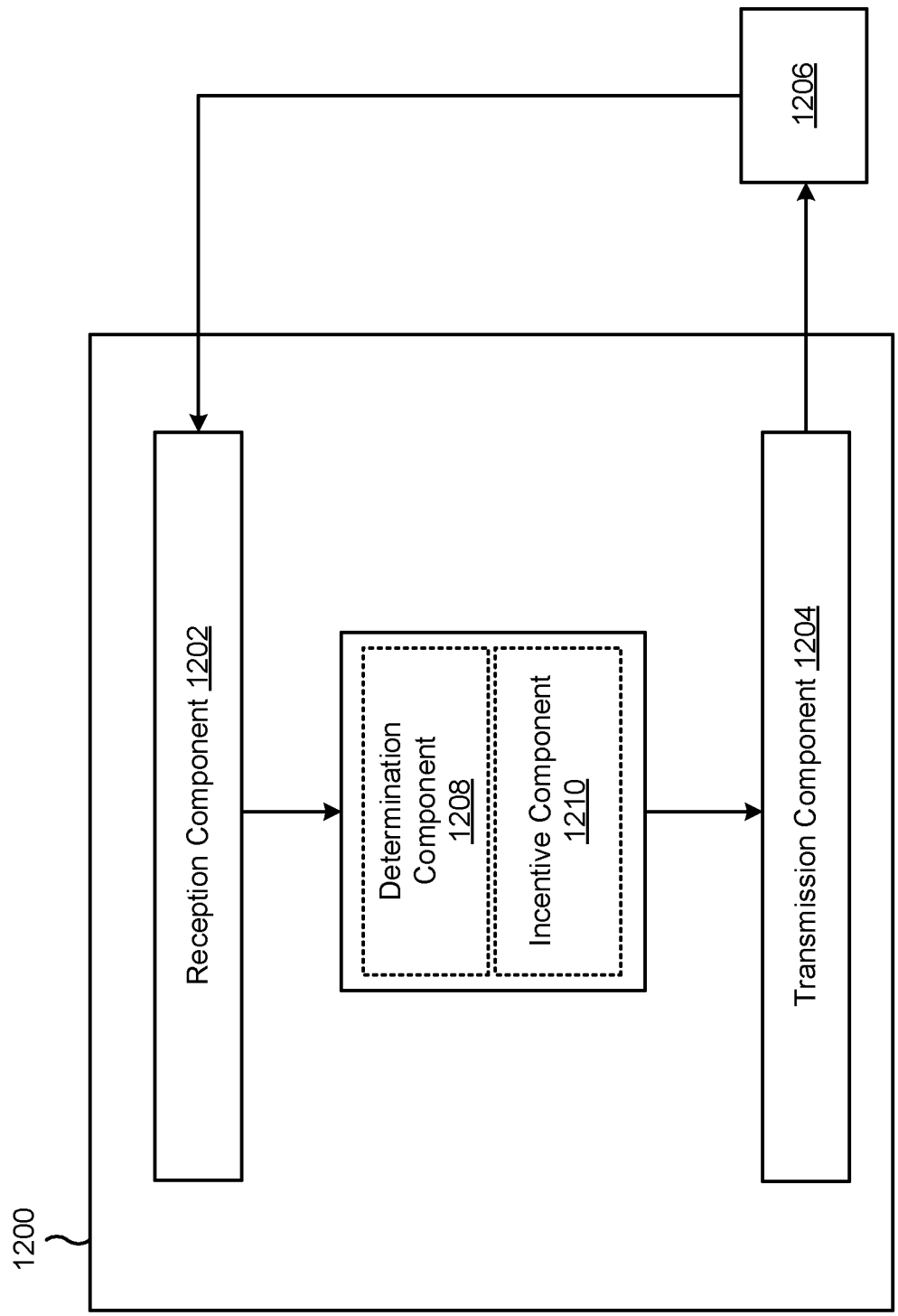
FIGS. 12, 13, and 14 are diagrams of example apparatuses for wireless communication, in accordance with the present disclosure.

FIG. 12 is a block diagram of an example apparatus 1200 for wireless communication. The apparatus 1200 may be a DU, or a DU may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a CU, a base station, a UE, a node of a core network, or another wireless communication device) using the reception component 1202 and the transmission component 1204. As further shown, the apparatus 1200 may include one or more of a determination component 1208 and/or an incentive component 1210, among other examples.

In some aspects, the apparatus 1200 may be configured to perform one or more operations described herein in connection with FIGS. 7-8. Additionally, or alternatively, the apparatus 1200 may be configured to perform one or more processes described herein, such as process 900 of FIG. 9, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

In some aspects, the determination component 1208 may determine at least one parameter associated with use of a relay device to forward data between the apparatus 1200 and one or more wireless devices. In some aspects, the at least one parameter may include a use time associated with the relay device, an amount of data associated with the relay device, or a combination thereof. The determination component 1208 may include a receive processor, a transmit MIMO processor, a transmit processor, a controller/processor, a memory, or a combination thereof, of the base station described above in connection with FIG. 2. Additionally, the transmission component 1204 may transmit, to the apparatus 1206, the at least one parameter.

In some aspects, the transmission component 1204 may transmit, to the relay device, at least one control command to forward the data between the apparatus 1200 and the one or more wireless devices. Accordingly, the determination component 1208 may determine the at least one parameter based at least in part on the at least one control command.

In some aspects, the reception component 1202 may receive, from the central network node, a request for the at least one parameter. Accordingly, the transmission component 1204 may transmit the at least one parameter based at least in part on the reception component 1202 receiving the request.

In some aspects, the at least one parameter may include a payment amount. Accordingly, the incentive component 1210 may determine the payment amount. The incentive component 1210 may include a receive processor, a transmit MIMO processor, a transmit processor, a controller/processor, a memory, or a combination thereof, of the base station described above in connection with FIG. 2. In some aspects, the reception component 1202 may receive, from the apparatus 1206, one or more variables used by the incentive component 1210 to determine the payment amount. In some aspects, the transmission component 1204 may additionally transmit, to the relay device, the payment amount.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
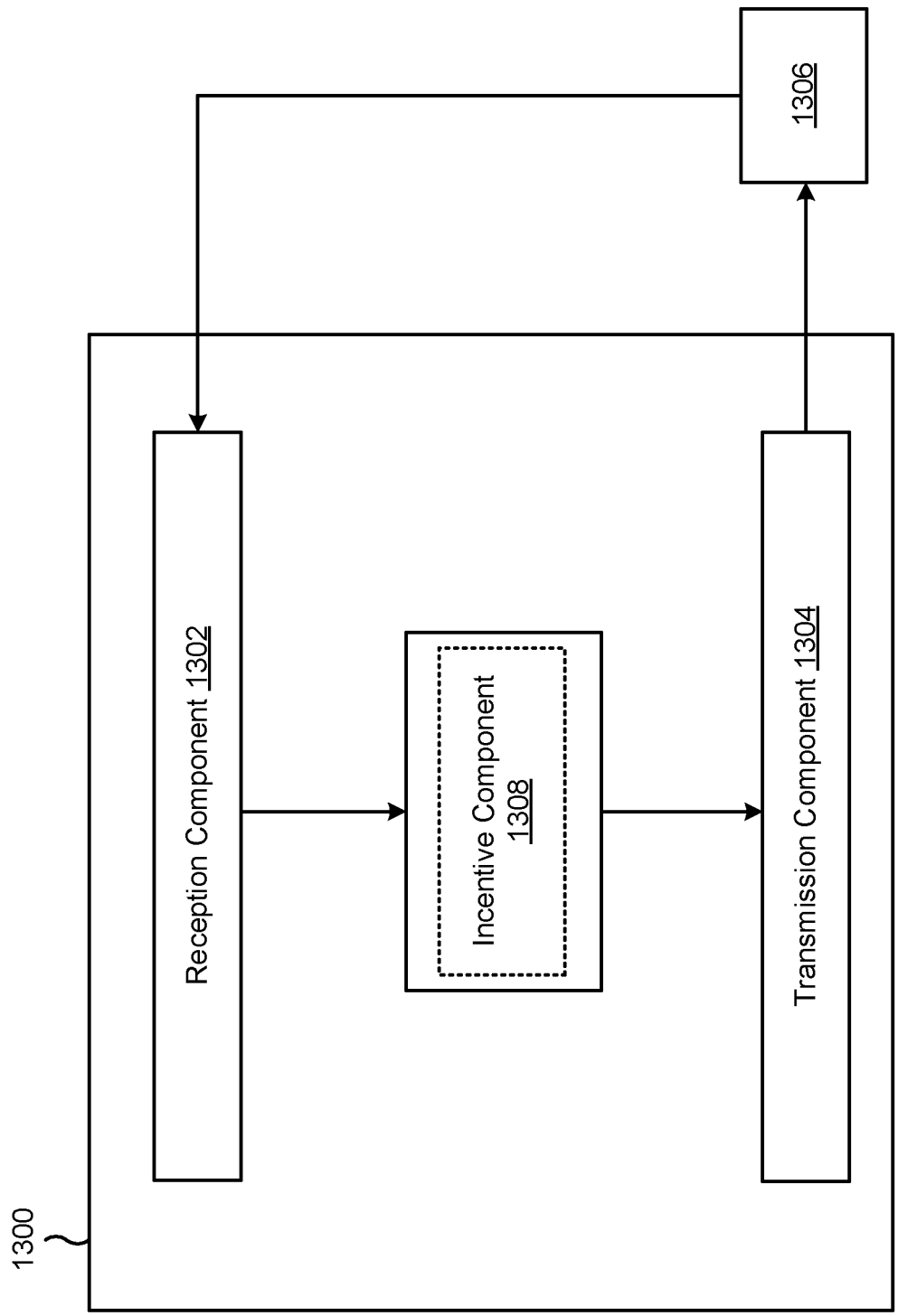

FIG. 13 is a block diagram of an example apparatus 1300 for wireless communication. The apparatus 1300 may be a CU, or a CU may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a DU, a base station, a UE, a node of a core network, or another wireless communication device) using the reception component 1302 and the transmission component 1304. As further shown, the apparatus 1300 may include an incentive component 1308, among other examples.

In some aspects, the apparatus 1300 may be configured to perform one or more operations described herein in connection with FIGS. 7-8. Additionally, or alternatively, the apparatus 1300 may be configured to perform one or more processes described herein, such as process 1000 of FIG. 10, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the CU described above in connection with FIG. 2. In some aspects, the transmission component 1304 may be co-located with the reception component 1302 in a transceiver.

In some aspects, the reception component 1302 may receive, from the apparatus 1306, at least one parameter associated with use of a relay device to forward data between the apparatus 1306 and one or more wireless devices. In some aspects, the at least one parameter may include a use time associated with the relay device, an amount of data associated with the relay device, or a combination thereof. Accordingly, the transmission component 1304 may transmit, to a central network node (e.g., an AMF and/or another portion of a core network), the at least one parameter.

In some aspects, the incentive component 1308 may determine a payment amount associated with the relay device. In some aspects, the incentive component 1308 may include a receive processor, a transmit MIMO processor, a transmit processor, a controller/processor, a memory, or a combination thereof, of the base station described above in connection with FIG. 2. In some aspects, the reception component 1302 may receive, from the central network node, one or more variables used by the incentive component 1308 to determine the payment amount. In some aspects, the transmission component 1304 may transmit, to the apparatus 1306 and/or the central network node, the payment amount.

In some aspects, the transmission component 1304 may transmit, to the apparatus 1306, a first request for the at least one parameter. Accordingly, the reception component 1302 may receive the at least one parameter based at least in part on transmitting the first request. In some aspects, the reception component 1302 may receive, from the central network node, a second request for the at least one parameter. Accordingly, the transmission component 1304 may transmit the first request based at least in part on the reception component 1302 receiving the second request.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
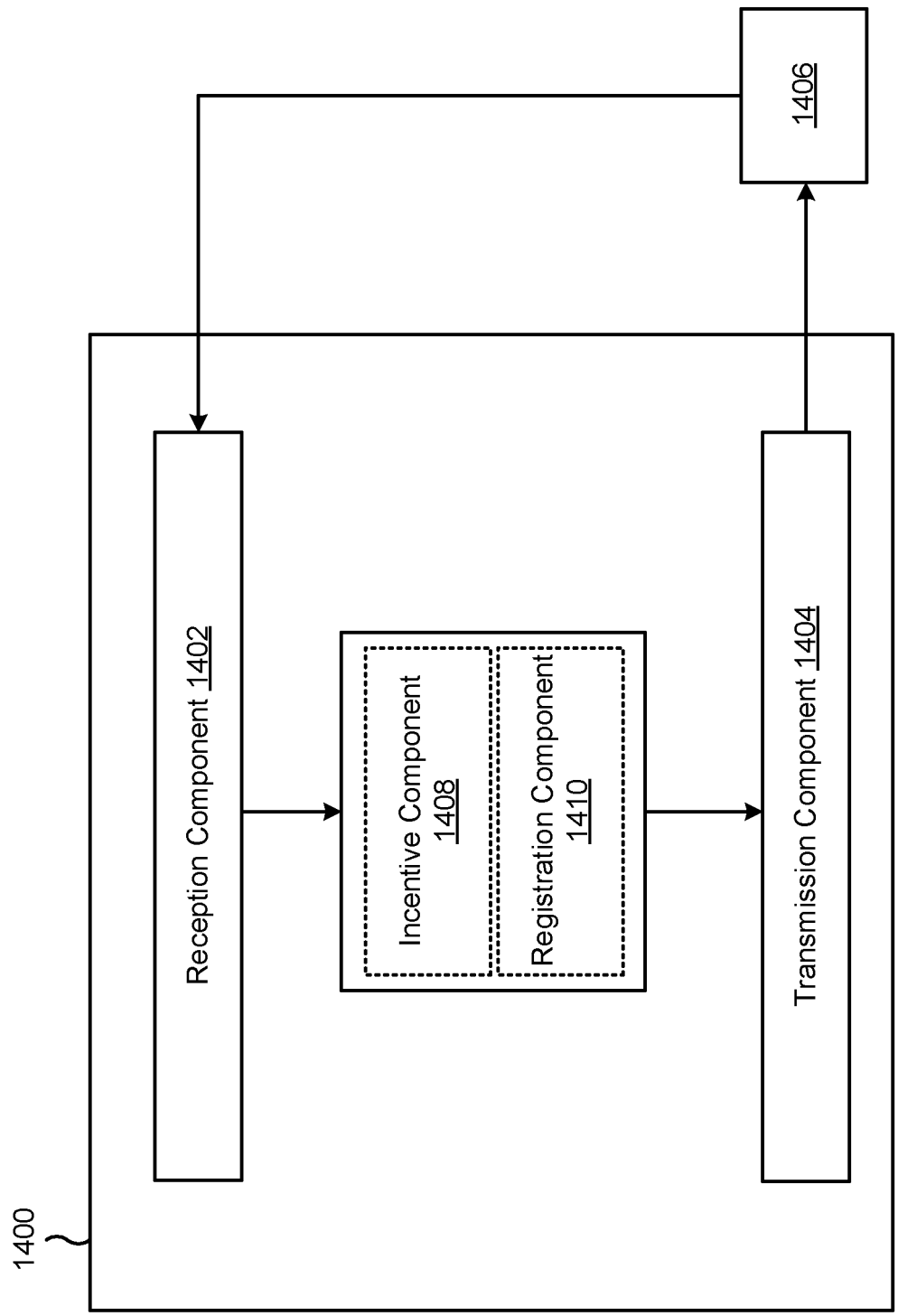

FIG. 14 is a block diagram of an example apparatus 1400 for wireless communication. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a CU, a DU, a base station, or another wireless communication device) using the reception component 1402 and the transmission component 1404. As further shown, the apparatus 1400 may include one or more of an incentive component 1408 and/or a registration component 1410, among other examples.

In some aspects, the apparatus 1400 may be configured to perform one or more operations described herein in connection with FIGS. 7-8. Additionally, or alternatively, the apparatus 1400 may be configured to perform one or more processes described herein, such as process 1100 of FIG. 11, or a combination thereof. In some aspects, the apparatus 1400 and/or one or more components shown in FIG. 14 may include one or more components of the network controller described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include a communication unit, a controller/processor, a memory, or a combination thereof, of the network controller described above in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include a communication unit, a controller/processor, a memory, or a combination thereof, of the network controller described above in connection with FIG. 2. In some aspects, the transmission component 1404 may be co-located with the reception component 1402 in a transceiver.

The reception component 1402 may receive, from the apparatus 1406, at least one parameter associated with use of a relay device to forward data with one or more wireless devices. In some aspects, the at least one parameter includes a use time associated with the relay device, an amount of data associated with the relay device, or a combination thereof. Additionally, the incentive component 1408 may determine, based at least in part on the at least one parameter, a payment amount associated with the relay device. In some aspects, the incentive component 1408 may include a controller/processor, a memory, or a combination thereof, of the network controller described above in connection with FIG. 2.

In some aspects, the transmission component 1404 may transmit, to the apparatus 1406, one or more variables used to determine the at least one parameter.

In some aspects, the transmission component 1404 may transmit, to the apparatus 1406, the payment amount.

In some aspects, the transmission component 1404 may transmit, to the apparatus 1406, a request for the at least one parameter. Accordingly, the reception component 1402 may receive the at least one parameter based at least in part on the transmission component 1404 transmitting the request.

Additionally, or alternatively, the reception component 1402 may receive, from the apparatus 1406 and/or directly from the relay device, an identification of the relay device. Accordingly, the transmission component 1404 may transmit, to the apparatus 1406 and/or directly to the relay device, a response to the identification. For example, the response may include an acknowledgement signal. Additionally, in some aspects, the registration component 1410 may indicate an operation mode for the relay device in the response. The registration component 1410 may include a controller/processor, a memory, or a combination thereof, of the network controller described above in connection with FIG. 2.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a network node, comprising: determining at least one parameter associated with use of a relay device to forward data between the network node and one or more wireless devices, the at least one parameter including a use time associated with the relay device, an amount of data associated with the relay device, or a combination thereof; and transmitting, to a central network node, the at least one parameter.

Aspect 2: The method of Aspect 1, wherein the network node comprises a distributed unit (DU) and the central network node comprises a central unit (CU).

Aspect 3: The method of Aspect 1, wherein the network node comprises a central unit (CU) and the central network node is at least a portion of a core network.

Aspect 4: The method of any of Aspects 1 through 3, further comprising: transmitting, to the relay device, at least one control command to forward the data between the network node and the one or more wireless devices, wherein the determining is based at least in part on the at least one control command.

Aspect 5: The method of Aspect 4, wherein the at least one control command includes scheduling information for forwarding the data between the network node and the one or more wireless devices.

Aspect 6: The method of any of Aspects 4 through 5, wherein the at least one control command includes an instruction message to forward the data between the network node and the one or more wireless devices.

Aspect 7: The method of any of Aspects 1 through 6, wherein the at least one parameter further includes at least one of: a type associated with the relay device, a time of day associated with the data forwarded between the network node and the one or more wireless devices, geographic information associated with the relay device, a type associated with the data forwarded between the network node and the one or more wireless devices, an indication of an uplink or a downlink, an amount of power consumed by the relay device, or a combination thereof.

Aspect 8: The method of any of Aspects 1 through 7, wherein the at least one parameter includes a payment amount associated with the relay device.

Aspect 9: The method of Aspect 8, wherein determining the at least one parameter comprises determining the payment amount based at least in part on: the use time associated with the relay device, the amount of data associated with the relay device, a type associated with the relay device, a time of day associated with the data forwarded between the network node and the one or more wireless devices, geographic information associated with the relay device, a type associated with the data forwarded between the network node and the one or more wireless devices, an indication of an uplink or a downlink, an amount of power consumed by the relay device, or a combination thereof.

Aspect 10: The method of any of Aspects 8 through 9, further comprising: receiving, from the central network node, one or more variables used to determine the payment amount.

Aspect 11: The method of any of Aspects 8 through 10, further comprising: transmitting, to the relay device, the payment amount.

Aspect 12: The method of any of Aspects 1 through 11, wherein the at least one parameter is transmitted periodically.

Aspect 13: The method of any of Aspects 1 through 12, further comprising: receiving, from the central network node, a request for the at least one parameter, wherein the at least one parameter is transmitted based at least in part on receiving the request.

Aspect 14: A method of wireless communication performed by a first network node, comprising: receiving, from a second network node, at least one parameter associated with use of a relay device to forward data between the second network node and one or more wireless devices, the at least one parameter including a use time associated with the relay device, an amount of data associated with the relay device, or a combination thereof; and transmitting, to a central network node, the at least one parameter.

Aspect 15: The method of Aspect 14, wherein the first network node comprises a central unit (CU) and the second network node comprises a distributed unit (DU).

Aspect 16: The method of Aspect 14, wherein the central network node is at least a portion of a core network.

Aspect 17: The method of any of Aspects 14 through 16, wherein the at least one parameter further includes at least one of: a type associated with the relay device, a time of day associated with the data forwarded between the second network node and the one or more wireless devices, geographic information associated with the relay device, a type associated with the data forwarded between the second network node and the one or more wireless devices, an indication of an uplink or a downlink, an amount of power consumed by the relay device, or a combination thereof.

Aspect 18: The method of any of Aspects 14 through 17, wherein the at least one parameter includes a payment amount associated with the relay device.

Aspect 19: The method of Aspect 18, further comprising: determining the payment amount based at least in part on: the use time associated with the relay device, the amount of data associated with the relay device, a type associated with the relay device, a time of day associated with the data forwarded between the second network node and the one or more wireless devices, geographic information associated with the relay device, a type associated with the data forwarded between the second network node and the one or more wireless devices, an indication of an uplink or a downlink, an amount of power consumed by the relay device, or a combination thereof.

Aspect 20: The method of any of Aspects 18 through 19, further comprising: receiving, from the central network node, one or more variables used to determine the payment amount.

Aspect 21: The method of any of Aspects 18 through 20, further comprising: transmitting, to the second network node, the payment amount.

Aspect 22: The method of any of Aspects 14 through 21, wherein the at least one parameter is received periodically.

Aspect 23: The method of any of Aspects 14 through 22, further comprising: transmitting, to the second network node, a first request for the at least one parameter, wherein the at least one parameter is received based at least in part on transmitting the first request.

Aspect 24: The method of Aspect 23, further comprising: receiving, from the central network node, a second request for the at least one parameter, wherein the first request is transmitted based at least in part on receiving the second request.

Aspect 25: A method of wireless communication performed by a first network node, comprising: receiving, from a second network node, at least one parameter associated with use of a relay device to forward data with one or more wireless devices, the at least one parameter including a use time associated with the relay device, an amount of data associated with the relay device, or a combination thereof and determining, based at least in part on the at least one parameter, a payment amount associated with the relay device.

Aspect 26: The method of Aspect 25, wherein the second network node comprises a central unit (CU).

Aspect 27: The method of Aspect 25, wherein the first network node is at least a portion of a core network.

Aspect 28: The method of any of Aspects 25 through 27, wherein the at least one parameter further includes at least one of: a type associated with the relay device, a time of day associated with the data forwarded with the one or more wireless devices, geographic information associated with the relay device, a type associated with the data forwarded with the one or more wireless devices, an indication of an uplink or a downlink, an amount of power consumed by the relay device, or a combination thereof.

Aspect 29: The method of any of Aspects 25 through 28, further comprising: transmitting, to the second network node, one or more variables used to determine the at least one parameter.

Aspect 30: The method of any of Aspects 25 through 29, further comprising: transmitting, to the second network node, the payment amount.

Aspect 31: The method of any of Aspects 25 through 30, wherein the at least one parameter is received periodically.

Aspect 32: The method of any of Aspects 25 through 31, further comprising: transmitting, to the second network node, a request for the at least one parameter, wherein the at least one parameter is received based at least in part on transmitting the request.

Aspect 33: A method of wireless communication performed by a relay device, comprising: receiving, from a network, data intended for one or more wireless devices; forwarding the data to the one or more wireless devices; and receiving, from the network, an indication of a payment amount associated with the relay device, wherein the payment amount is based at least in part on a use time associated with the relay device, an amount of data associated with the relay device, or a combination thereof.

Aspect 34: The method of Aspect 33, further comprising: receiving, from the network, at least one control command to forward the data to the one or more wireless devices, wherein the payment amount is determined based at least in part on the at least one control command.

Aspect 35: The method of Aspect 34, wherein the at least one control command includes scheduling information for forwarding the data to the one or more wireless devices.

Aspect 36: The method of any of Aspects 34 through 35, wherein the at least one control command includes an instruction message to forward the data to the one or more wireless devices.

Aspect 37: The method of any of Aspects 33 through 36, wherein the payment amount is further based on one or more of: a type associated with the relay device, a time of day associated with the data forwarded between the network and the one or more wireless devices, geographic information associated with the relay device, a type associated with the data forwarded between the network and the one or more wireless devices, an indication of an uplink or a downlink, an amount of power consumed by the relay device, or a combination thereof.

Aspect 38: An apparatus for wireless communication at a device, comprising a processor; memory coupled with the processor; and instructions stored in the memory and executable by the processor to cause the apparatus to perform the method of one or more of Aspects 1-13.

Aspect 39: A device for wireless communication, comprising a memory and one or more processors coupled to the memory, the one or more processors configured to perform the method of one or more of Aspects 1-13.

Aspect 40: An apparatus for wireless communication, comprising at least one means for performing the method of one or more of Aspects 1-13.

Aspect 41: A non-transitory computer-readable medium storing code for wireless communication, the code comprising instructions executable by a processor to perform the method of one or more of Aspects 1-13.

Aspect 42: A non-transitory computer-readable medium storing a set of instructions for wireless communication, the set of instructions comprising one or more instructions that, when executed by one or more processors of a device, cause the device to perform the method of one or more of Aspects 1-13.

Aspect 43: An apparatus for wireless communication at a device, comprising a processor; memory coupled with the processor; and instructions stored in the memory and executable by the processor to cause the apparatus to perform the method of one or more of Aspects 14-24.

Aspect 44: A device for wireless communication, comprising a memory and one or more processors coupled to the memory, the one or more processors configured to perform the method of one or more of Aspects 14-24.

Aspect 45: An apparatus for wireless communication, comprising at least one means for performing the method of one or more of Aspects 14-24.

Aspect 46: A non-transitory computer-readable medium storing code for wireless communication, the code comprising instructions executable by a processor to perform the method of one or more of Aspects 14-24.

Aspect 47: A non-transitory computer-readable medium storing a set of instructions for wireless communication, the set of instructions comprising one or more instructions that, when executed by one or more processors of a device, cause the device to perform the method of one or more of Aspects 14-24.

Aspect 48: An apparatus for wireless communication at a device, comprising a processor; memory coupled with the processor; and instructions stored in the memory and executable by the processor to cause the apparatus to perform the method of one or more of Aspects 25-32.

Aspect 49: A device for wireless communication, comprising a memory and one or more processors coupled to the memory, the one or more processors configured to perform the method of one or more of Aspects 25-32.

Aspect 50: An apparatus for wireless communication, comprising at least one means for performing the method of one or more of Aspects 25-32.

Aspect 51: A non-transitory computer-readable medium storing code for wireless communication, the code comprising instructions executable by a processor to perform the method of one or more of Aspects 25-32.

Aspect 52: A non-transitory computer-readable medium storing a set of instructions for wireless communication, the set of instructions comprising one or more instructions that, when executed by one or more processors of a device, cause the device to perform the method of one or more of Aspects 25-32.

Aspect 53: An apparatus for wireless communication at a device, comprising a processor; memory coupled with the processor; and instructions stored in the memory and executable by the processor to cause the apparatus to perform the method of one or more of Aspects 33-37.

Aspect 54: A device for wireless communication, comprising a memory and one or more processors coupled to the memory, the one or more processors configured to perform the method of one or more of Aspects 33-37.

Aspect 55: An apparatus for wireless communication, comprising at least one means for performing the method of one or more of Aspects 33-37.

Aspect 56: A non-transitory computer-readable medium storing code for wireless communication, the code comprising instructions executable by a processor to perform the method of one or more of Aspects 33-37.

Aspect 57: A non-transitory computer-readable medium storing a set of instructions for wireless communication, the set of instructions comprising one or more instructions that, when executed by one or more processors of a device, cause the device to perform the method of one or more of Aspects 33-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
    a memory; and
    one or more processors, coupled to the memory, configured to:
        determine at least one parameter associated with use of a relay device to forward data between the network node and one or more wireless devices, the at least one parameter including a use time associated with the relay device, an amount of data associated with the relay device, or a combination thereof;
        transmit, to the relay device, at least one control command to forward the data between the network node and the one or more wireless devices; and
        transmit, to a central network node, the at least one parameter, wherein the at least one parameter is based at least in part on the at least one control command.

2. The apparatus of claim 1, wherein the network node comprises a distributed unit (DU), and the central network node comprises a central unit (CU).

3. The apparatus of claim 1, wherein the network node comprises a central unit (CU), and the central network node comprises at least a portion of a core network.

4. The apparatus of claim 1, wherein the at least one control command includes scheduling information for forwarding the data between the network node and the one or more wireless devices.

5. The apparatus of claim 1, wherein the at least one control command includes an instruction message to forward the data between the network node and the one or more wireless devices.

6. The apparatus of claim 1, wherein the at least one parameter further includes at least one of:
    a type associated with the relay device,
    a time of day associated with the data forwarded between the network node and the one or more wireless devices,
    geographic information associated with the relay device,
    a type associated with the data forwarded between the network node and the one or more wireless devices,
    an indication of an uplink or a downlink,
    an amount of power consumed by the relay device, or
    a combination thereof.

7. The apparatus of claim 1, wherein the at least one parameter includes a payment amount associated with the relay device.

8. The apparatus of claim 7, wherein the one or more processors are further configured to:
    receive, from the central network node, one or more variables used to determine the payment amount.

9. The apparatus of claim 7, wherein the one or more processors are further configured to:
    transmit, to the relay device, the payment amount.

10. An apparatus for wireless communication at a first network node, comprising:
    a memory; and
    one or more processors, coupled to the memory, configured to:
        receive, from a central network node, one or more variables used to determine a payment amount associated with a relay device;
        receive, from a second network node, at least one parameter associated with use of the relay device to forward data between the second network node with one or more wireless devices, the at least one parameter including a use time associated with the relay device, an amount of data associated with the relay device, or a combination thereof and
        transmit, to a central network node, the at least one parameter.

11. The apparatus of claim 10, wherein the first network node comprises a central unit (CU), and the second network node comprises a distributed unit (DU).

12. The apparatus of claim 10, wherein the central network node comprises at least a portion of a core network.

13. The apparatus of claim 10, wherein the at least one parameter further includes at least one of:
    a type associated with the relay device,
    a time of day associated with the data forwarded between the second network node and the one or more wireless devices,
    geographic information associated with the relay device,
    a type associated with the data forwarded between the second network node and the one or more wireless devices,
    an indication of an uplink or a downlink,
    an amount of power consumed by the relay device, or
    a combination thereof.

14. The apparatus of claim 10, wherein the at least one parameter includes a payment amount associated with the relay device.

15. The apparatus of claim 14, wherein the one or more processors are further configured to:
    transmit, to the second network node, the payment amount.

16. An apparatus for wireless communication at a first network node, comprising:
    a memory; and
    one or more processors, coupled to the memory, configured to:
        receive, from a second network node, at least one parameter associated with use of a relay device to forward data with one or more wireless devices, the at least one parameter including a use time associated with the relay device, an amount of data associated with the relay device, or a combination thereof;

determine, based at least in part on the at least one parameter, a payment amount associated with the relay device; and transmit, to the second network node, the payment amount.

17. The apparatus of claim 16, wherein the second network node comprises a central unit (CU).

18. The apparatus of claim 16, wherein the first network node comprises at least a portion of a core network.

19. The apparatus of claim 16, wherein the at least one parameter further includes at least one of:

a type associated with the relay device, a time of day associated with the data forwarded with the one or more wireless devices, geographic information associated with the relay device, a type associated with the data forwarded with the one or more wireless devices, an indication of an uplink or a downlink, an amount of power consumed by the relay device, or a combination thereof.

20. The apparatus of claim 16, wherein the one or more processors are further configured to:

transmit, to the second network node, one or more variables used to determine the at least one parameter.

21. The apparatus of claim 16, wherein the at least one parameter is received periodically.

22. The apparatus of claim 16, wherein the one or more processors are further configured to:

transmit, to the second network node, a request for the at least one parameter, wherein the at least one parameter is received based at least in part on transmitting the request.

23. An apparatus for wireless communication at a relay device, comprising:

a memory; and one or more processors, coupled to the memory, configured to:

receive, from a network, data intended for one or more wireless devices;

receive, from the network, at least one control command to forward the data to the one or more wireless devices;

forward the data to the one or more wireless devices; and receive, from the network, an indication of a payment amount associated with the relay device, wherein the payment amount is based at least in part on the at least one control command, and further based at least in part on a use time associated with the relay device, an amount of data associated with the relay device, or a combination thereof.

24. The apparatus of claim 23, wherein the at least one control command includes scheduling information for forwarding the data to the one or more wireless devices.

25. The apparatus of claim 23, wherein the at least one control command includes an instruction message to forward the data to the one or more wireless devices.

26. The apparatus of claim 23, wherein the payment amount is further based on one or more of:

a type associated with the relay device, a time of day associated with the data forwarded between the network and the one or more wireless devices, geographic information associated with the relay device, a type associated with the data forwarded between the network and the one or more wireless devices, an indication of an uplink or a downlink, an amount of power consumed by the relay device, or a combination thereof.

* * * * *